US010674334B2

(12) United States Patent
Nguyen

(10) Patent No.: US 10,674,334 B2
(45) Date of Patent: Jun. 2, 2020

(54) METHODS AND DEVICE FOR TRANSMISSION COLLISION DETECTION AND HANDLING IN VEHICLE TO EVERYTHING COMMUNICATION SYSTEM

(71) Applicant: NEC CORPORATION, Tokyo (JP)

(72) Inventor: Phong Nguyen, Victoria (AU)

(73) Assignee: NEC CORPORATION, Minato-ku, Tokyo (JP)

( * ) Notice: Subject to any disclaimer, the term of this patent is extended or adjusted under 35 U.S.C. 154(b) by 21 days.

(21) Appl. No.: 16/067,153

(22) PCT Filed: Dec. 16, 2016

(86) PCT No.: PCT/JP2016/087578
§ 371 (c)(1),
(2) Date: Jun. 29, 2018

(87) PCT Pub. No.: WO2017/126266
PCT Pub. Date: Jul. 27, 2017

(65) Prior Publication Data
US 2019/0007974 A1 Jan. 3, 2019

(30) Foreign Application Priority Data

Jan. 22, 2016 (AU) .................................. 2016900197

(51) Int. Cl.
*H04W 4/40* (2018.01)
*H04W 4/44* (2018.01)
(Continued)

(52) U.S. Cl.
CPC ............... *H04W 4/44* (2018.02); *H04L 67/12* (2013.01); *H04W 4/40* (2018.02); *H04W 4/70* (2018.02);
(Continued)

(58) Field of Classification Search
None
See application file for complete search history.

(56) References Cited

U.S. PATENT DOCUMENTS

2013/0322413 A1* 12/2013 Pelletier ............ H04W 72/1289
370/336
2014/0315593 A1* 10/2014 Vrzic .................... H04W 52/38
455/522

(Continued)

FOREIGN PATENT DOCUMENTS

WO 2015/172395 A1 11/2015

OTHER PUBLICATIONS

Communication dated Jul. 23, 2019, from the European Patent Office in counterpart European Application No. 16886505.3.
(Continued)

*Primary Examiner* — Kodzovi Acolatse
*Assistant Examiner* — The Hy Nguyen
(74) *Attorney, Agent, or Firm* — Sughrue Mion, PLLC

(57) ABSTRACT

A vehicle-to-everything (V2X) communication system, and method of communication in the V2X communication system is provided. The method includes: selecting, at a first V2X device, a control channel of a control channel resource pool; transmitting, on the selected control channel, sidelink control information (SCI) to a second V2X device; monitoring, at the first V2X device, an SCI acknowledgement (SCI-ACK) resource pool for an SCI-ACK indicator (SCI-ACK-IND) corresponding to the transmitted SCI; and in response to receiving a positive SCI-ACK-IND corresponding to the transmitted SCI, transmitting data to the second V2X device in a data resource pool according to the SCI.

17 Claims, 17 Drawing Sheets

(51) Int. Cl.
*H04W 4/70* (2018.01)
*H04L 29/08* (2006.01)
*H04W 74/08* (2009.01)

(52) U.S. Cl.
CPC ... *H04W 74/0816* (2013.01); *H04W 74/0825* (2013.01)

(56) References Cited

U.S. PATENT DOCUMENTS

| | | | |
|---|---|---|---|
| 2015/0172956 A1 | 6/2015 | Noh et al. | |
| 2015/0334721 A1 | 11/2015 | Kim et al. | |
| 2015/0334760 A1 | 11/2015 | Sartori et al. | |
| 2016/0330011 A1* | 11/2016 | Lee | H04L 5/0066 |
| 2017/0041103 A1* | 2/2017 | Maattanen | H04L 1/1671 |
| 2017/0054540 A1* | 2/2017 | Kim | H04L 5/0048 |
| 2017/0230915 A1* | 8/2017 | Kim | H04W 72/12 |
| 2017/0347394 A1* | 11/2017 | Yasukawa | H04W 28/04 |
| 2018/0103490 A1* | 4/2018 | Li | H04W 88/02 |
| 2018/0270011 A1* | 9/2018 | Yang | H04B 7/0626 |

OTHER PUBLICATIONS

"Discussion of Resource Allocation for PC5 based V2V", Fujitsu, Nov. 15-22, 2015, 3GPP TSG-RAN WG1 Meeting #83, R1-156618, Anaheim, USA.

"Collision avoidance for Mode 2", Huawei, HiSilicon, 3GPP TSG RAN WG1 Meeting #83, Nov. 15-22, 2015, R1-156932, Anaheim, USA.

"Discussion on Resource Allocation Enhancement for PC5 based V2V Communications", NTT DOCOMO, 3GPP TSG RAN WG1 Meeting #83, Nov. 16-20, 2015, R1-157438, Anaheim, USA.

"Resource collision detection and handling", NEC, 3GPP TSG RAN WG1 Meeting #84, Feb. 15-19, 2016, R1-160393, St. Julian's, Malta.

Written Opinion for PCT/JP2016/087578, dated Feb. 21, 2017.

International Search Report for PCT/JP2016/087578, dated Feb. 21, 2017.

* cited by examiner

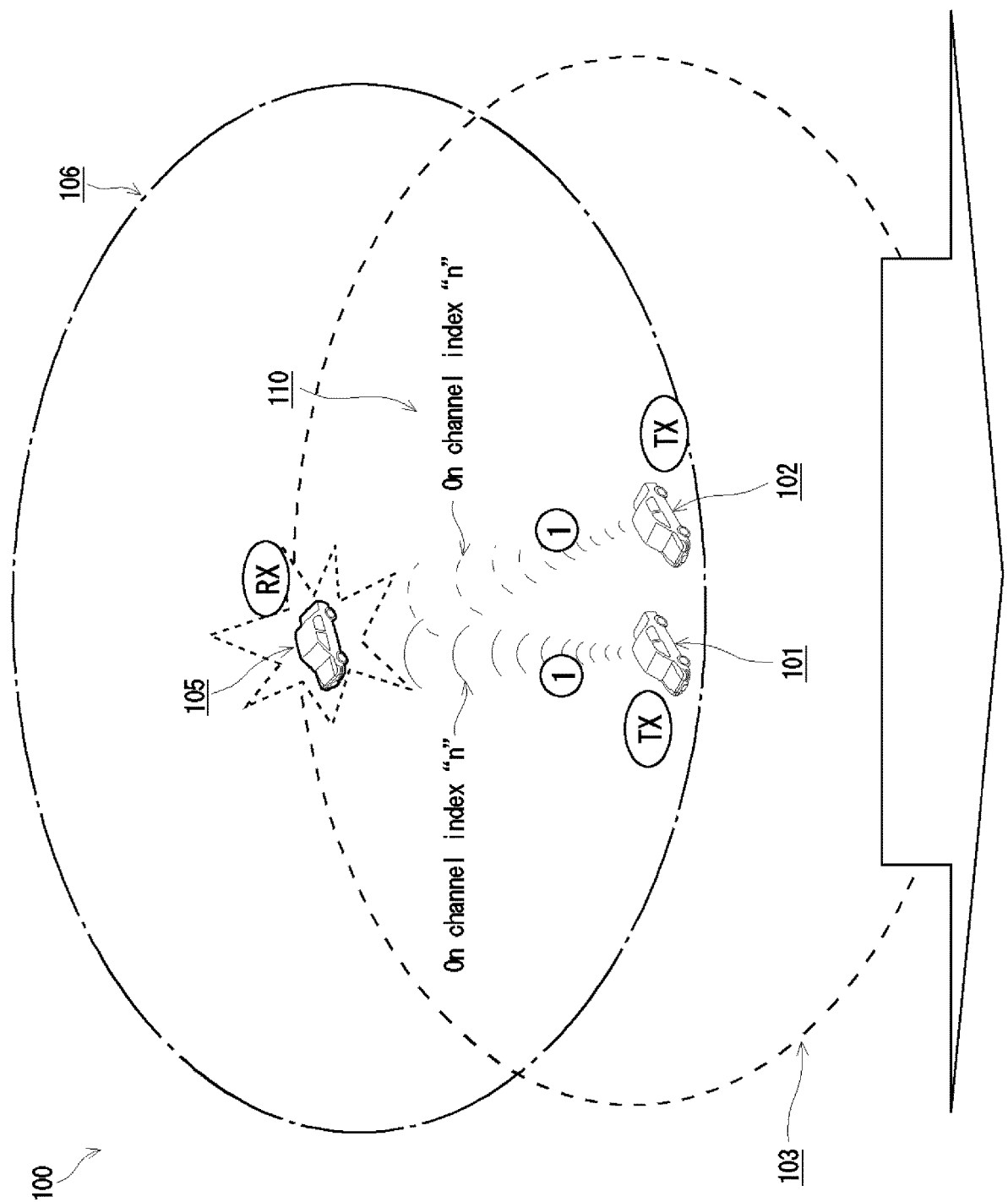

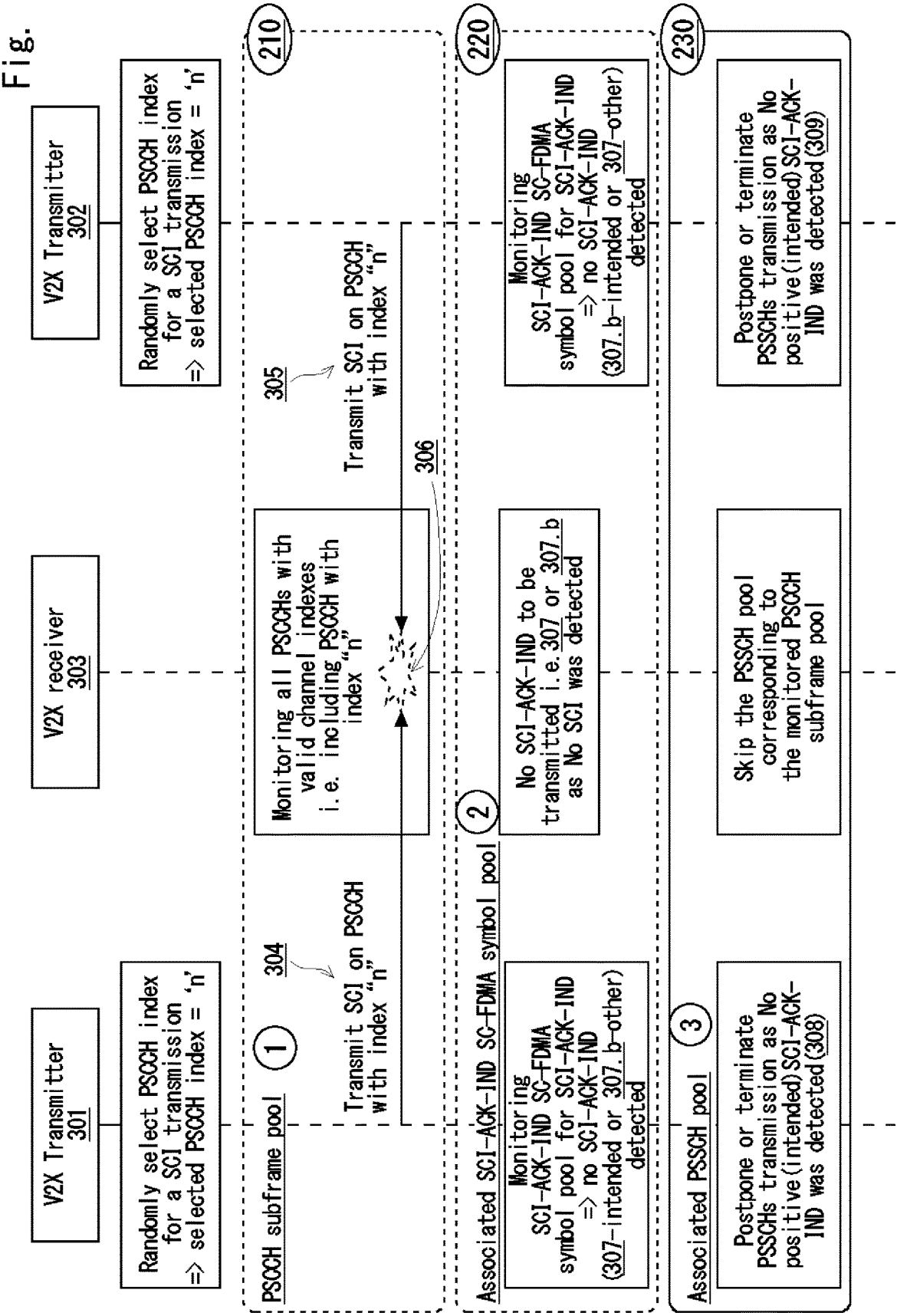

METHODS AND DEVICE FOR TRANSMISSION COLLISION DETECTION AND HANDLING IN VEHICLE TO EVERYTHING COMMUNICATION SYSTEM

This application is a National Stage of International Application No. PCT/JP2016/087578 filed Dec. 16, 2016, claiming priority based on Australia Patent Application No. 2016900197 filed Jan. 22, 2016, the disclosure of which is incorporated in its entirety by reference.

TECHNICAL FIELD

The present invention relates to data communication. In particular, the present invention relates to Vehicle to Everything (V2X) communication.

BACKGROUND ART

ABBREVIATIONS

| | |
|---|---|
| 3GPP | $3^{rd}$ Generation Partnership Project |
| ACK | Acknowledgement |
| BPSK | Binary Phase-shift Keying |
| CAM | Cooperative Awareness Message |
| CDM | Code Division Multiplexing |
| CP | Cyclic Prefix |
| D2D or ProSe | Device to Device communication, direct communication |
| DFT | Discrete Fourier Transform |
| DL | Downlink |
| DSRC | Dedicated Short Range Communication |
| ETSI | European Telecommunications Standards Institute |
| FDM | Frequency Division Multiplexing |
| FDMA | Frequency Division Multiple access |
| IEEE | Institute of Electrical and Electronics Engineers |
| IND | Indicator |
| LTE | Long Term Evolution |
| LTE-A | LTE-Advanced |
| LTE-D2D | LTE based Direct communication |
| LTE-PC5 | LTE based Sidelink air interface |
| MAC-PDU | Medium Access Control - Packet Data Unit |
| NACK | Negative Acknowledgment |
| OFDMA | Orthogonal Frequency Division Multiple Access |
| PRB | Physical Resource Block |
| ProSe | Proximity Services |
| PSCCH | Physical Sidelink Control Channel |
| PSSCH | Physical Sidelink Shared Channel |
| QPSK | Quadrature Phase Shift Keying |
| RB | Resource Block |
| RE | Resource Element |
| RX | Receive |
| SA | Scheduling Assignment |
| SC-FDMA | Single Carrier - FDMA |
| SCI | Sidelink Control information |
| SCI-ACK-IND | SCI acknowledgement indicator |
| SC-Period | Sidelink Communication Period |
| Sidelink | UE to UE interface for sidelink communication and sidelink discovery |
| TRP or T-RPT | Time Resource Pattern |
| TX | Transmit |
| UL | Uplink |
| V2I | Vehicle to Infrastructure communication |
| V2P | Vehicle to Pedestrian communication |
| V2V | Vehicle to Vehicle communication or communication between vehicles |
| V2X | Vehicle to Everything communication |
| VANET | Vehicular Ad-Hoc Network |
| VC-Period | Sidelink communication period for V2X communication or V2X Communication Period |
| WAVE | Wireless Access for Vehicular Environment |

Vehicle-to-Everything (V2X) communication enables vehicles to communicate with other vehicles (i.e. Vehicle-to-Vehicle (V2V) communication), with infrastructure such as traffic lights (i.e. Vehicle-to-Infrastructure (V2I) communication), with pedestrians (i.e. Vehicle-to-Pedestrian (V2P) communication, and even with the owner's home (i.e. Vehicle-to-Home (V2H) communication).

V2X systems can be used in a wide range of scenarios, including in relation to road safety, where it has been estimated that V2X systems can prevent over 80 percent of accidents by unimpaired drivers by alerting the drivers to hidden dangers that can't be sensed by traditional on-board equipment such as sensors.

In related to traffic efficiency, V2X systems, in combination with a nationwide data collection and processing network, may further facilitate environmental improvements, as well as improvements to public safety, mobility, productivity and convenience, by providing optimised traffic routing, traffic flow, traffic control and incident management.

In V2V communication, data may be shared between V2X-equipped vehicles within a half-mile or 800 m radius of each other, which can be used to provide a driver with a global view of traffic and be alerted to the most common causes of accidents in time to take evasive action. In more advanced applications, an evasive action may be initiated by the receiving vehicle automatically.

Various radio access technologies, including IEEE 802.11a in DSRC and IEEE 802.11p in WAVE or VANET, have been considered for V2X systems. However, IEEE 802.11 based radio access technologies are unnecessarily complex, and more suitable for non-deterministic message transmission. In particular, V2X services generally require deterministic and low latency message transmission, whereas 802.11 based technology is generally high latency.

Recently, 3rd Generation Partnership Project (3GPP) Long Term Evolution (LTE) technology has been considered for V2X services. 3GPP LTE technology is being deployed all over the world and at a rapid pace, which enables more and more advanced services and internet applications that utilise the higher data rate, lower latency, and enhanced coverage that 3GPP LTE provides. Widely deployed LTE-based networks provide opportunities for the vehicle industry to realise the concept of "connected cars".

Furthermore, recently standardised 3GPP Release 12 device-to-device (D2D) or ProSe feature enables devices to directly communication over a side-link (PC5) radio interface without network coverage. As such, these standards have attracted strong interest from vehicle manufacturers and other road-safety agencies as a candidate for vehicular communication.

Technically, LTE-D2D or LTE-PC5 technology, and especially sidelink (PC5) interfaces, are suitable for use in V2X communication, and in particular in V2V/V2I communication in and/or out of network coverage, where distributed resource allocation is essential.

However, data collision, especially where there are high numbers of V2X terminals within close proximity to one another, or outside the transmission range of each other, is a problem when LTE technology is used for V2X communication.

In particular, in a communication period (SC-Period), there is a high probability that more than one V2X terminal will select the same channel index for control channel transmission, causing a collision. Furthermore, legacy V2X communication employs half-duplex technology, which prevents a V2X terminal from detecting the collision, because on subframes allocated for transmission a V2X terminal cannot simultaneously listen for data from other V2X terminals. Furthermore, collision on a control channel directly results in message loss and may lead to further collisions on data channels.

FIG. 1A illustrates a part of an exemplary scenario 100, according to the related art, where collision on unicast is illustrated. FIG. 1B illustrates the remaining part of the exemplary scenario 100, according to the related art, where collision on unicast is illustrated.

First and second V2X terminals 101, 102 are within close proximity of each other and have the same transmission range 103. On an SC-Period 110, both the first and second V2X terminals 101, 102 happen to have data to transmit to a third V2X terminal 105. In a PSCCH subframe pool 111 within the SC-Period 110, both the first and second V2X terminals 101, 102 happen to select the same control channel index 112 (i.e. channel index "0") for transmitting SCI. This results in full collision at the third V2X terminal 105, and as such, the third V2X terminal cannot detect and decode the SCI transmitted by either the first or second V2X terminal 101, 102.

As the first and second V2X terminals 101, 102 are unaware of the collision, both V2X terminals 101, 102 transmit MAC-PDUs on PSSCHs in an associated PSSCH pool 115. These transmitted MAC-PDUs will be unheard by the third V2X terminal 105 as no control information has been detected.

In case one-to-one mapping is provided between the control channel index and a T-RPT pattern, further collision 117 occurs in relation to the PSSCH. As the SCI was not detected and decodable at the third V2X terminal 115, the transmission of the SCI on the PSSCHs merely caused noise and interference to other near V2X terminals.

Technically, random back-off may be employed at the first and second V2X terminals 101, 102 where each V2X terminal 101, 102 randomly selects a delay before transmitting the SCI. However, this introduces additional delay. Furthermore, the network topology may change when V2X terminals 101, 102 move rapidly, and such latency may actually lead to collisions with other, incoming V2X terminals.

FIG. 2 illustrates an exemplary scenario 150, according to the related art, where collision on broadcast/groupcast is illustrated.

First and second V2X terminals 151, 152 belong to the same group, are in close proximity of each other and have the same transmission range 150.b. As such, the first and second V2X terminals 151, 152 are aware of the presence to each other.

On an SC-Period, both V2X terminals 151, 152 happen to have data to transmit to other V2X terminals 155, 156, 157, 158 in the same group, and happen to select the same control channel index 153 (i.e. channel index "0") for transmitting SCI.

This results in full collision at the other V2X terminals 155, 156, 157, 158. As such, the other V2X terminals 155, 156, 157, 158 cannot detect and decode the SCI. The V2X terminals 151, 152 are unable to detect if a collision has happened, and as such, both V2X terminals 151, 152 transmit MAC-PDUs on PSSCHs in the associated PSSCH pool, which causes further collision.

When hidden terminals are present, the collision can be more severe as two or more V2X transmitters may not be aware of the presence of each other because they are out-of-transmission range with each other. FIG. 3 illustrates an exemplary scenario 170, according to the related art, where collision caused by a hidden terminal is illustrated.

A first V2X terminal 171 having a first transmission range 172, and a second V2X terminal 173 having a second transmission range 174, are out-of-transmission range of each other, and as such, are not aware of the presence of each other. On an SC-Period, both V2X terminals 171, 173 happen to have data to transmit to a third V2X terminal 175, which in turn has a third transmission range 176 covering both V2X terminals 171, 173.

Both V2X terminals 171, 173 happen to select the same control channel index "0" in a PSCCH subframe pool, for transmitting SCI 180. This results in full collision 181 at the third V2X terminal 175, and as such, the V2X terminal 175 cannot detect and decode the SCI. Since the V2X terminals 171, 173 are unable to detect the collision 181, both V2X terminals 171, 173 transmit MAC PDUs on PSSCHs 190, 191 in the associated PSSCH pool.

In the case there is one-to-one mapping between control channel index and TRP, further collision 192 on PSSCHs transmission occurs at the V2X terminal 175.

As the SCIs were not detected and decodable at the V2X terminal 175, the transmission of the data merely increases noise and interference for other V2X terminals.

In certain circumstances, for example due to differences in channel gain between the first V2X terminal 171 and the third V2X terminal 175, and between the second V2X terminal 173 and the third V2X terminal 175, the third V2X terminal 175 may detect and decode SCI transmitted from one of the V2X terminals 171, 173 but not the other. However, further PSSCH transmission 190, 191 from the V2X terminals 171, 173 results in data collision.

Accordingly, there is a need for improved Vehicle to Everything (V2X) data communication.

It will be clearly understood that, if a related art publication is referred to herein, this reference does not constitute an admission that the publication forms part of the common general knowledge in the art in Australia or in any other country.

SUMMARY OF INVENTION

Technical Problem

The present invention is directed to vehicle-to-everything (V2X) communication systems and methods, which may at least partially overcome at least one of the abovementioned disadvantages or provide the consumer with a useful or commercial choice.

Solution to Problem

With the foregoing in view, the present invention in one form, resides broadly in a data communication method for use in a vehicle-to-everything (V2X) communication system, the method including:

selecting, at a first V2X device, a control channel of a control channel resource pool;

transmitting, on the selected control channel, sidelink control information (SCI) to a second V2X device;

monitoring, at the first V2X device, an SCI acknowledgement (SCI-ACK) resource pool for an SCI-ACK indicator (SCI-ACK-IND) corresponding to the transmitted SCI; and in response to receiving a positive SCI-ACK-IND corresponding to the transmitted SCI, transmitting data to the second V2X device in a data resource pool according to the SCI.

The method may further include:

determining that a positive SCI-ACK-IND corresponding to further SCI has not been received; and in response thereto, postponing transmission of the data relating to the further SCI until at least a subsequent VC-Period.

The control channel may be randomly or pseudo-randomly selected from the control channel resource pool.

The first V2X device may monitor the control channel resource pool in a VC-Period for other V2X channel usage prior to transmission of data on a subsequent VC-Period.

The control channel resource pool, the SCI-ACK resource pool and the data resource pool form a communication period.

The communication period may comprise a legacy sidelink communication period (SC-Period) including the SCI-ACK resource pool.

The SCI-ACK resource pool may comprises one or more SC-FDMA symbols from one or more V2X subframes.

The number of SC-FDMA symbols collectively forming the SCI-ACK resource pool may be equal to the number of subframes that form the control channel resource pool.

The method may further include a one-to-one mapping between control channel indexes in the control channel resource pool, and SCI-ACK-IND channel indexes in the SCI-ACK resource pool.

Preferably, multiple SCI-ACK-IND channels are frequency-multiplexed on a physical resource block for transmission on the same SC-FDMA symbol or symbols. Alternatively, multiple SCI-ACK-IND channels are code-multiplexed using control channel indexes for self-deriving orthogonal spreading codes, for transmission on the same SC-FDMA symbol.

The SCI-ACK-IND may comprise an SCI transmitter identifier and a destination identifier. The destination identifier may comprise a group destination identifier.

The SCI-ACK-IND may be channel-encoded and modulated to form a sequence of symbols, wherein the sequence is DFT-precoded and RE-mapped on subcarriers of a SCI-ACK-IND channel of the SCI-ACK resource pool The sequence of symbols may be spreaded using an orthogonal spreading code is derived from an associated control channel index.

The spreaded sequence of symbols may be resource-element-mapped at least partially over an SC-FDMA symbol.

The SCI-ACK-IND signal transmitted at plurality of second V2X terminals may be timing advance adjusted to reach the first V2X device within a cyclic prefix (CP) length.

The method may further comprise:

monitoring, at a third V2X device, the SCI-ACK resource pool for SCI-ACK-INDs corresponding to SCI of other V2X devices;

wherein a control channel of the control channel resource pool is selected at the third V2X device at least in part according to a received SCI-ACK-IND of another V2X device.

In another form, the invention resides broadly in a vehicle-to-everything (V2X) communication system including a first V2X device and a second V2X device, wherein the first V2X device is configured to:

select a control channel of a control channel resource pool;

transmit, on the selected control channel, sidelink control information (SCI) to the second V2X device;

monitor, at the first V2X device, an SCI acknowledgement (SCI-ACK) resource pool for an SCI-ACK indicator (SCI-ACK-IND) corresponding to the transmitted SCI; and in response to receiving a positive SCI-ACK-IND corresponding to the transmitted SCI, transmit data to the second V2X device in a data resource pool according to the SCI.

Embodiments of the present invention provides a communication period and structure for use in transmitting and receiving V2X data messages by V2X devices, and associated methods for enabling V2X collision detection and handling, and in particular where distributed resource allocation and frequent network topology changes due to device mobility are present.

The vehicular communication period (VC-Period) may comprise a legacy LTE based SC-Period (i.e. a sidelink communication period), where one or more SC-FDMA symbols are chosen from the control channel resource pool or/and the data channel resource pools for transmission of a sidelink control information acknowledgement indicator (SCI-ACK-IND). The VC-Period may comprise a resource pool that is logically formed from N number of V2X subframes allocated for control channel transmission at one or more first V2X terminals, an associated resource pool being logically forming from N number of SC-FDMA symbols, from one or more V2X subframes, allocated for SCI-ACK-IND transmission at one or more second V2X terminals; and resource pools being logically forming from X number of V2X subframes allocated for data channels transmission at one or more first V2X terminals.

The SCI-ACK SC-FDMA symbol pool may be further partitioned into plurality SCI-ACK-IND channels and then indexed in such a way that there exists a one-to-one association between a control channel index in the control channel subframe pool and an SCI-ACK-IND channel index in the associated SCI-ACK symbol pool. As such, a control channel with a particular index in the control channel subframe pool points to SC-FDMA symbols and PBRs (frequency bins block) or associated orthogonal spreading code allocated for SCI-ACK-IND channel with the corresponding index in the associated SCI-ACK subframe pool.

A unique SCI-ACK-IND, for being mapped on a SCI-ACK-IND channel at one or more second V2X terminals, comprises at least a first V2X terminal ID and a second V2X terminal ID (or of second terminals' group ID). This is then which is channel coded to form a unique sequence or orthogonally spreaded unique sequence for non-coherent detection at one or more first V2X terminals.

Furthermore, a unique SCI-ACK-IND when being transmitted from multiple second V2X terminals in the same group may be designed to reach the intended first V2X terminal within a CP length making the SCI-ACK-IND signal being transmitted from multiple transmitters appear at the intended receiver as multipath signal.

According to embodiments of the present invention, control channel collision may occur fully or partially. A "full collision" is where none of the SCIs transmitted on the same selected channel are successfully detected, and a "partial collision" is where one SCI (of multiple colliding SCIs on the same channel) is successfully detected at a V2X terminal.

Embodiments of the present invention assist V2X terminals in realising if collision(s) have happened on their control channel transmission(s). In particular, for each successfully detected SCI, a receiving V2X terminal responds with a unique SCI-ACK-IND signal which is transmitted on the SCI-ACK-IND channel with index corresponding to the indexed control channel on which it has successfully detected the SCI.

After transmitting a SCI on a selected control channel in the control channel subframe pool, V2X terminals monitor the associated SCI-ACK symbol pool and particularly on the SCI-ACK-IND channel(s) corresponding to the control channel(s) on which it has transmitted an SCI intended to another V2X terminal. If no SCI-ACK-IND signal or SCI-ACK-IND signal intended to other V2X terminal is received and detected, the V2X terminal may consider collision has happened and that its transmitted SCI was failed to be detected and decoded. The V2X terminal may then postpone its data transmission to the next available VC-Period, or terminate the current data messages transmission where it is considered appropriate. This protects the data from other V2X terminals in the associated data pools.

Upon detecting a positive SCI-ACK-IND signal, the V2X terminal may determine that no collision has happened and its transmitted SCI was successfully detected and decoded at the second V2X terminal. As such, the V2X terminal may transmit data in the associated data resource pool.

Any of the features described herein can be combined in any combination with any one or more of the other features described herein within the scope of the invention.

The reference to any related art in this specification is not, and should not be taken as an acknowledgement or any form of suggestion that the related art forms part of the common general knowledge.

BRIEF DESCRIPTION OF DRAWINGS

Various embodiments of the invention will be described with reference to the following drawings FIG. 1A illustrates a part of an exemplary scenario, according to the related art, where collision on unicast is illustrated.

FIG. 9B illustrates the remaining part of the exemplary collision handline scenario, according to an embodiment of the present invention.

DESCRIPTION OF EMBODIMENTS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

Figure 1B:
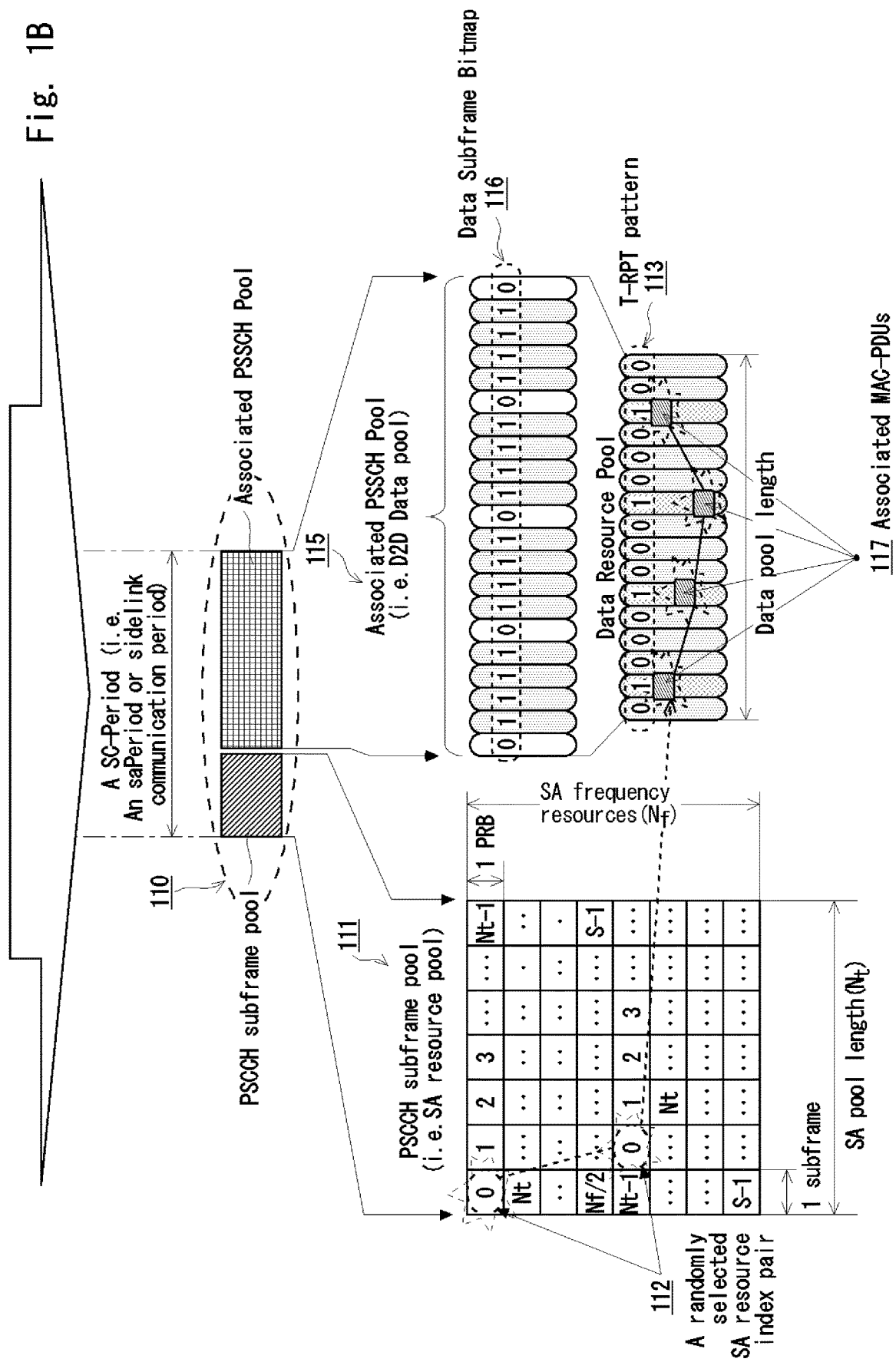
FIG. 1B illustrates the remaining part of the exemplary scenario 100, according to the related art, where collision on unicast is illustrated.
Figure 2:
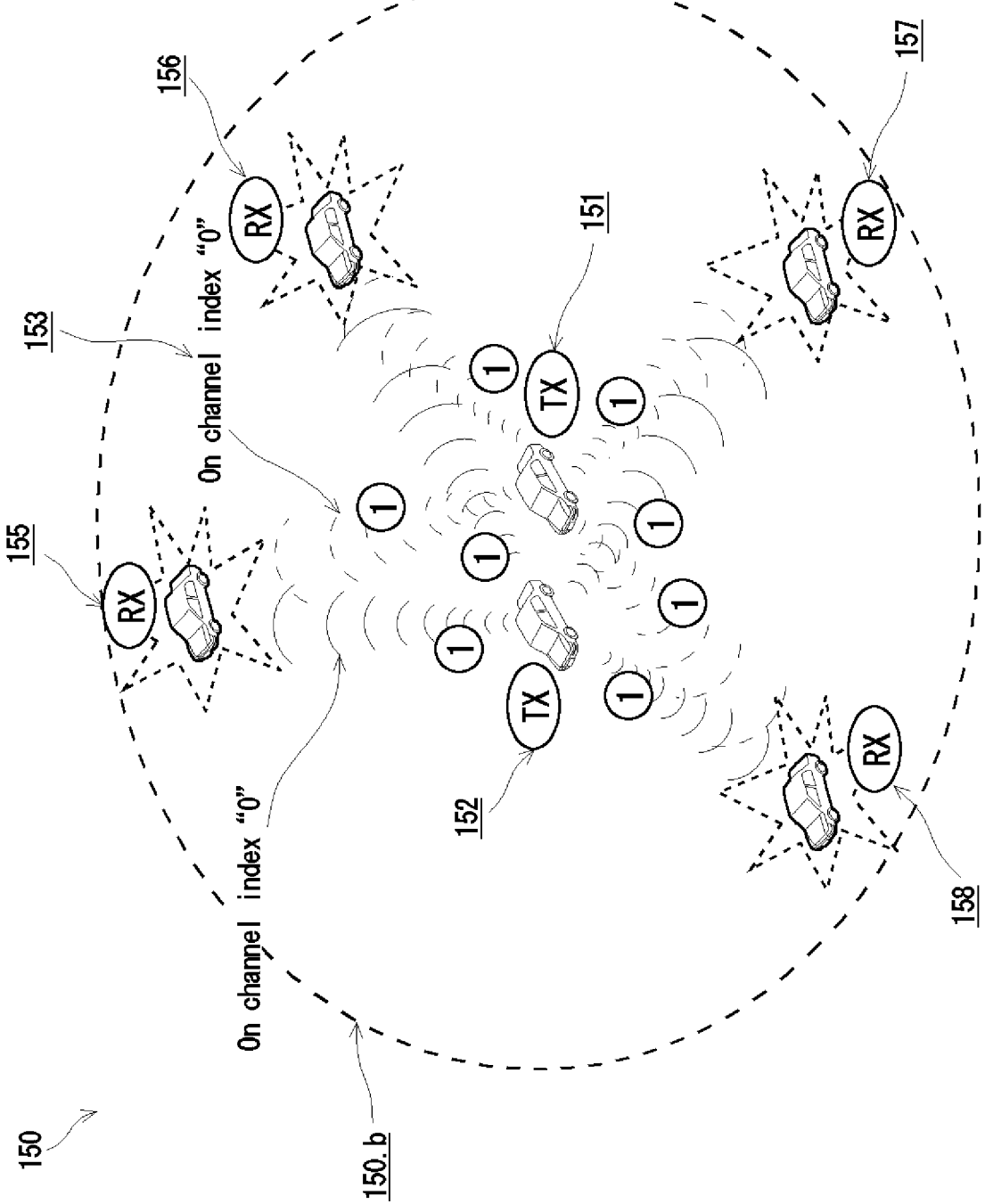
FIG. 2 illustrates an exemplary scenario, according to the related art, where collision on broadcast/groupcast is illustrated.
Figure 3:
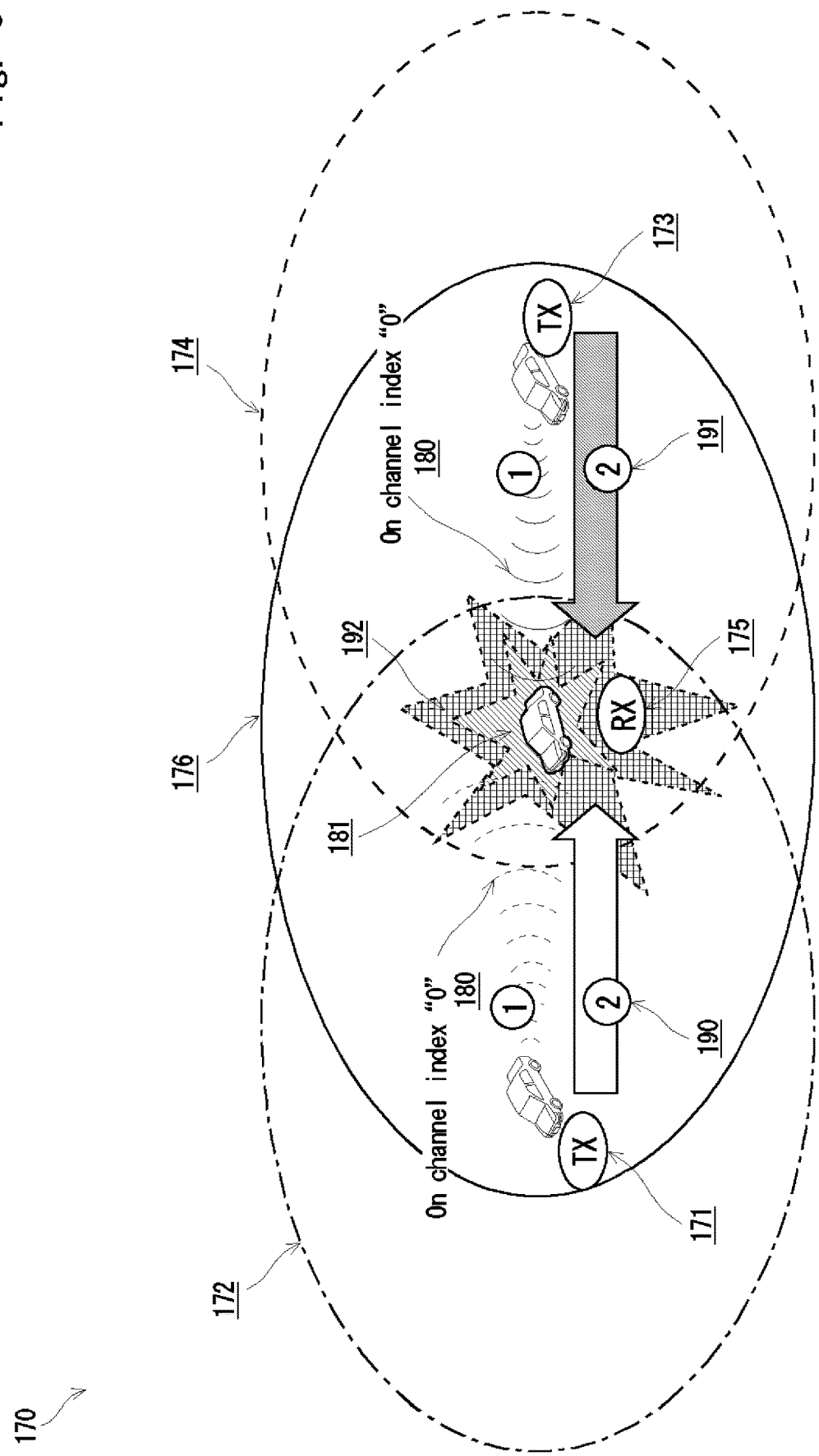
FIG. 3 illustrates an exemplary scenario, according to the related art, where collision caused by a hidden terminal is illustrated.
Figure 4:
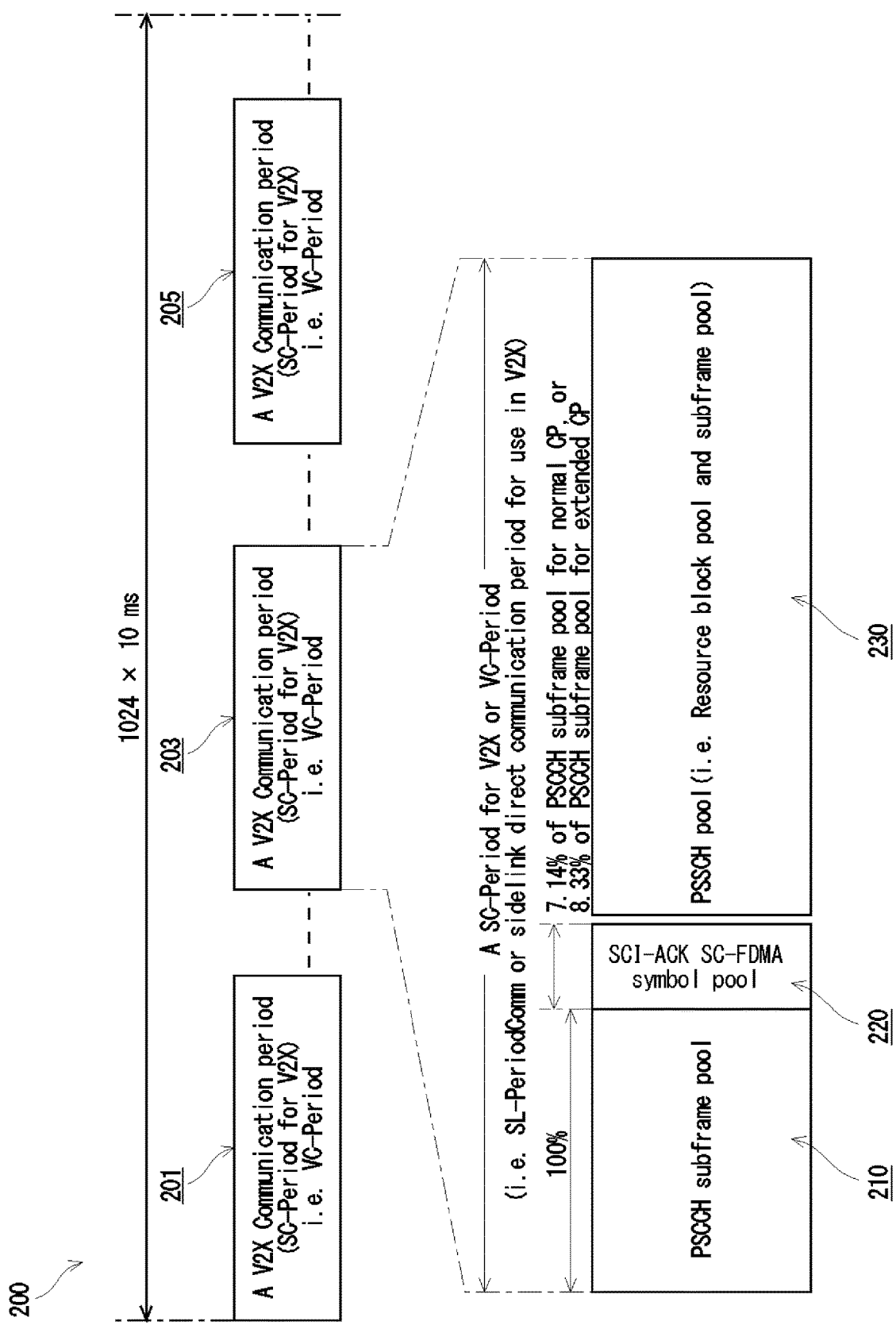
FIG. 4 illustrates a communication period structure of a V2X system, according to an embodiment of the present invention.

FIG. 4 illustrates a communication period structure 200 of a V2X system, according to an embodiment of the present invention. The communication period structure 200 assists in collision detection and handling in V2X communication, as discussed below.

The structure 200 comprises one or more VC-Periods 201, 203, and/or 205, that are time-multiplexed, potentially also with legacy sidelink communication periods (SC-Periods), in a super-frame period of 1024×10 ms. Each VC-Period, such as VC-Period 203, comprises a PSCCH subframe pool 210, a SCI-ACK symbol pool 220 and one or more PSSCH Pools 230.

The PSCCH subframe pool 210 comprises a plurality of PSCCHs, for transmission of SCI to one or more other V2X terminals, or to a group of V2X terminals.

The SCI-ACK symbol pool 220 (or SCI-ACK SC-FDMA symbol pool), is for transmission of SCI-ACK indicators (SCI-ACK-INDs) by V2X terminal(s) that have successfully detected and decoded SCI intended for them.

The one or more PSSCH pools 230 comprise a plurality of PSSCHs, for transmission of MAC-PDUs by V2X terminals that have transmitted SCI in the PSCCH subframe pool 210. The V2X terminals may detect a positive SCI-ACK-IND, corresponding to the transmitted SCI, on the SCI-ACK SC-FDMA symbol pool 220, and transmit the PDUs in response thereto. Alternatively, the V2X terminal may, for example if the V2X terminal is not aware of the SCI-ACK symbol pool, assume that the transmitted SCI was successfully received.

The SCI-ACK symbol pool 220 is about 7.14% of the size of the corresponding PSCCH subframe pool 210 for normal CP lengths, and 8.33% of the size of the corresponding PSCCH subframe pool 210 for extended CP lengths.

The SCI-ACK symbol pool 220 is preferably located directly after the PSCCH subframe pool 210 in a VC-Period 201, 203, 205. For example, for normal CP lengths, a PSCCH subframe pool 210 with the length of Nt=14 subframes has a corresponding SCI-ACK subframe pool 220 of 14 SC-FDMA symbols, or 1 logical subframe.

According to certain embodiments of the present invention, more than one V2X terminal that has detected the same SCI may concurrently transmit the same SCI-ACK-IND to the same other V2X terminal. In such case, the SCI-ACK-IND signals, are constructively summed for further non-coherent detection.

Figure 5:
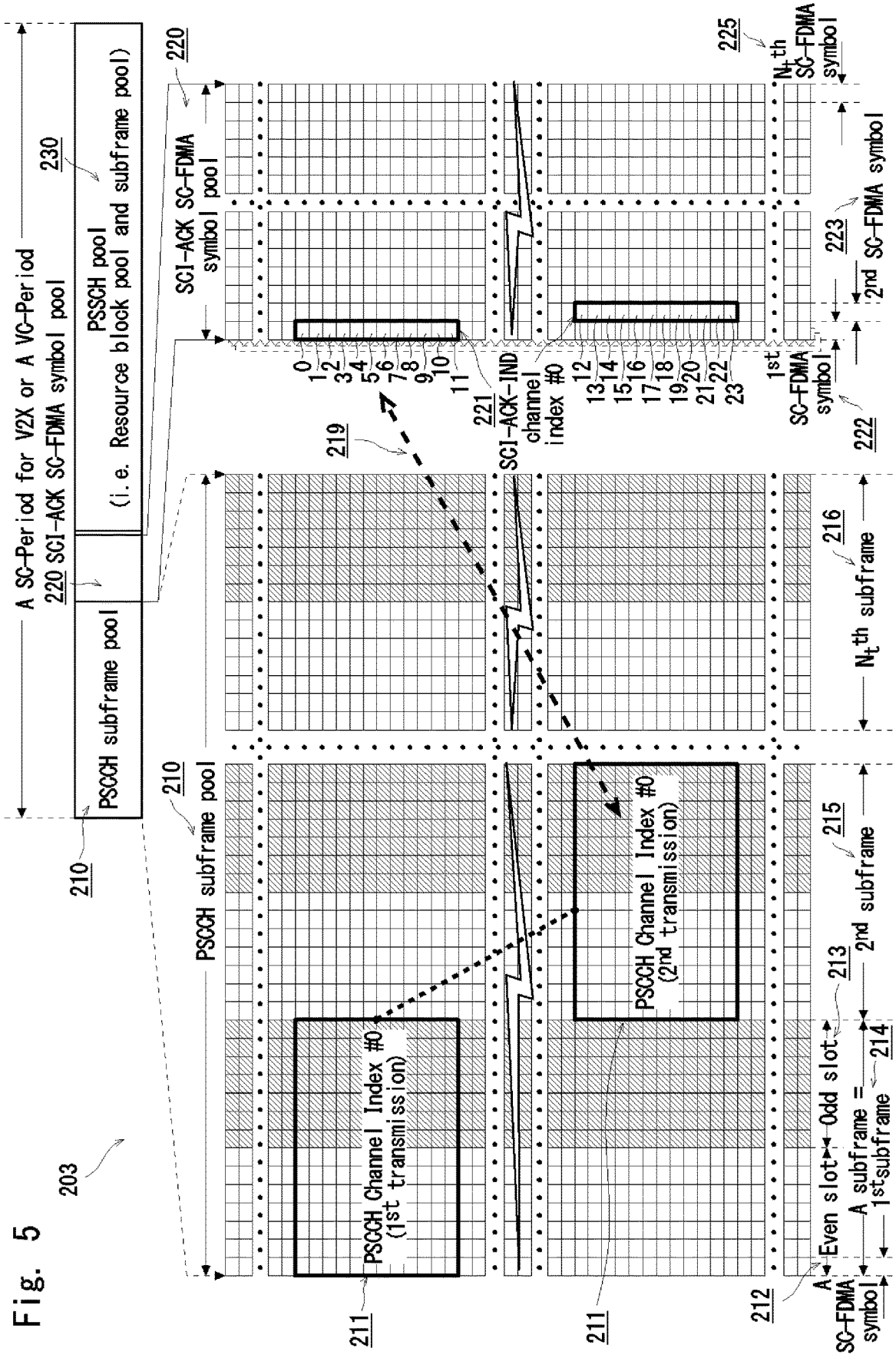
FIG. 5 illustrates further detail of a VC-Period of the communication period structure of FIG. 4, according to an embodiment of the present invention.

FIG. 5 illustrates further detail of the VC-Period 203, according to an embodiment of the present invention.

The VC-Period 203 includes a one-to-one mapping 219 (illustrated for index 0) between a) a PSCCH channel index allocated for transmitting SCI and its repetition (illustrated as 211 for PSCCH index 0), and b) the corresponding SCI-ACK-IND channel index (illustrated as 221 for SCI-ACK-IND channel index 0). Furthermore, multiple SCI-ACK-IND channels sharing the same SC-FDMA symbols are frequency-multiplexed (i.e. using FDM).

Figure 6:
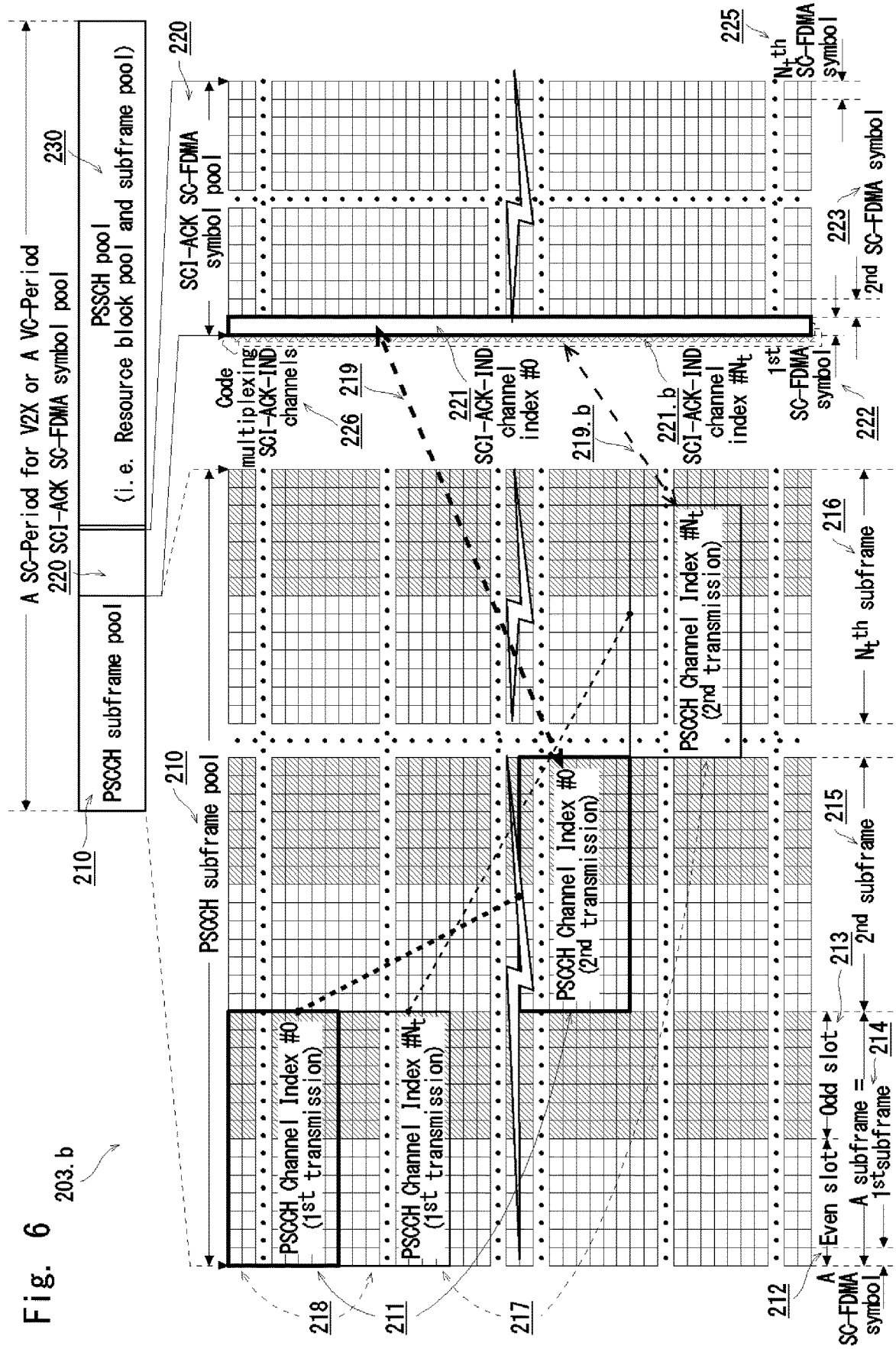
FIG. 6 illustrates further detail of a VC-Period, according to an alternative embodiment of the present invention.

FIG. 6 illustrates further detail of a VC-Period 203.b, according to an alternative embodiment of the present invention. The VC period 203.b is similar to the VC period 203, but where the multiple SCI-ACK-IND channels sharing the same SC-FDMA symbols are code-multiplexed (i.e. using CDM).

In groupcast or broadcast V2X communication, there may be more than one V2X terminal that successfully detects a transmitted SCI. These V2X terminals concurrently, and on the same SCI-ACK channel, respond to the detected SCI with the SCI-ACK-IND, and using the same orthogonal spreading code if code-multiplexing is used. In particular, each V2X terminal takes the same SCI-ACK-IND and performs channel-coding to form a unique signature with a length of 24-bits or more. The unique signature is implicitly known at both transmitter and receiver, which enables the V2X terminal that transmitted the successfully detected SCI (i.e. on PSCCH channel index #0) to be determined.

Additional spreading may be applied if code-multiplexing of the SCI-ACK-IND is used. In particular, an orthogonal spreading code may be self-derived based on the control channel index on which a SCI has been detected.

The SCI-ACK-IND comprises at least a 'group destination ID' and a 'SCI transmitter ID', to assist the device that transmitted the SCI in identifying if the transmitted SCI has been subjected to partial collision, full collision, or whether the receiver has departed from the region. Partial collision is where the SCI was failed to be received at the receiver, and full collision is where the SCI and other SCI were failed to be received at the receivers. Receiver departure is where the receiver has departed from the region, and thus has failed to receive (and thus do not acknowledge) the SCI.

The SCI-ACK-IND 221 comprises a 16-bit SCI transmitter ID and an 8-bit group destination ID to forming the unique 24-bit SCI-ACK-IND. The SCI-ACK-IND is then BPSK modulated forming 24 symbols for DFT-precoding. Alternatively the SCI-ACK-IND is repeated twice (i.e. at 0.5 code rate) and then QPSK modulated to form 24 symbols. The symbols are then mapped to 2 lots of 12 consecutive REs in a resource block (i.e. REs 0 to 11 and REs 12 to 23).

The REs may be distributed over a first SC-FDMA symbol 222 and a second SC-FDMA symbol 223, i.e. two separated logical SC-FDMA symbols, within the SCI-ACK SC-FDMA symbol pool 220. In such case, the REs may align with the associated PSCCH channel indexing pattern i.e. the first transmission 211 in the first subframe 214 and the repetition 211 in the second subframe 215.

Furthermore, the SCI-ACK SC-FDMA symbol pool 220 is a configurable collection of SC-FDMA symbols in one or more subframes allocated for V2X communication, where each SC-FDMA symbol in the SC-FDMA symbol pool 220 is indexed corresponding to the subframe in the PSCCH subframe pool 210.

For example, the first SC-FDMA symbol 222, the second SC-FDMA symbol 223, to $N_t^{th}$ SC-FDMA symbol 225 in the PSCCH subframe pool 210 are indexed with reference to the first subframe 214, the second subframe 215 to $N_t^{th}$ subframe 216 in the PSCCH subframe pool 210 within a VC-Period.

The SCI-ACK-IND channels corresponding to the control channels (PSCCHs) with indexes sharing the same subframe may be frequency-multiplexed (FIG. 5). Alternatively, the SCI-ACK-IND channels (e.g. 221 and 221.b) that correspond to control channels 211, 217 with indexes sharing the same subframe (e.g. 218), are code-multiplexed 226 on an SC-FDMA symbol 222 (FIG. 6).

Figure 7:
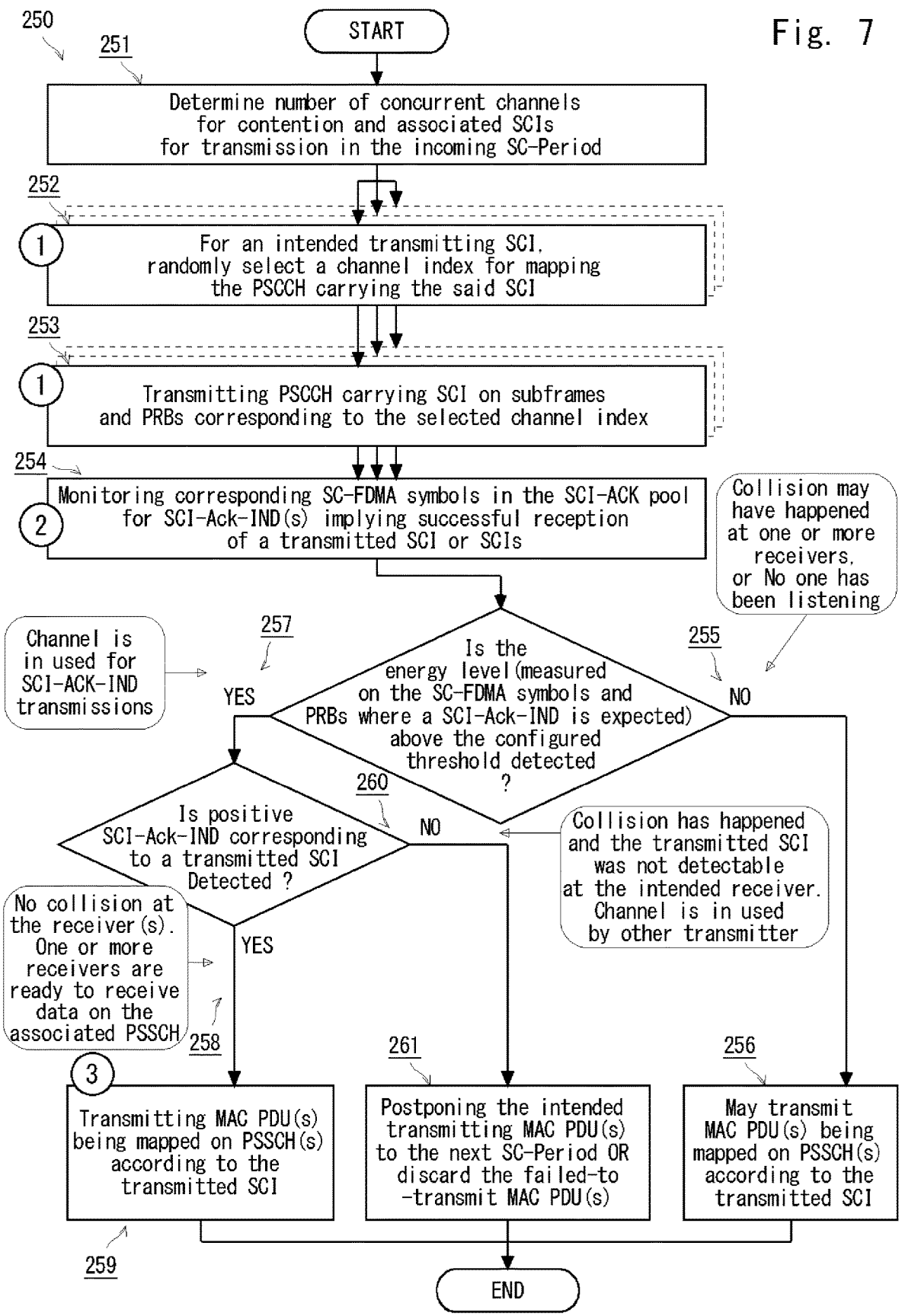
FIG. 7 illustrates a method of collision detection and handling, for use at a V2X data transmitter according to an embodiment of the present invention.

FIG. 7 illustrates a method 250 of collision detection and handling, according to an embodiment of the present invention. The method may be used in association with the above disclosed VC-Period structure and at a V2X terminal that has data (i.e. one or more MAC PDUs) for transmission.

At step 251, the V2X terminal determines the number of PSCCHs required to transmit the SCI data in the VC-Period, according to the number of V2X messages for concurrent transmission.

At step 252, the V2X terminal randomly selects a PSCCH index, for each of the number of required PSCCHs, to map the PSCCH REs.

At step 253, the SCI data is transmitted on the subframes corresponding to the selected PSCCH index(es) within the VC-Period.

At step 254, the SC-FDMA symbols corresponding to selected PSCCH index(es) are monitored. In particular, the SC-FDMA symbols are monitored on the SCI-ACK SC-FDMA symbol pool associated with the PSCCH subframe pool in which the SCIs are transmitted, for positive SCI-ACK-INDs, which implying successful reception of its transmitted SCI data.

If the energy level, measured on the monitored SC-FDMA symbols and PRBs where a SCI-ACK-IND is expected, is equal or above an implementation configurable threshold (as illustrated by 257), and the SCI-ACK-IND is positive (as illustrated by 258), then the V2X terminal transmits the MAC PDU(s) carryingV2X messages on the data channels (PSSCHs) at step 259.

The energy level being above the threshold indicates that the channel is used for SCI-ACK-IND data, and the positive SCI-ACK-IND indicates that there was no collision at the receiver. As such, these MAC PDU(s) carryingV2X messages are guaranteed for reception at the receiver(s) who has responded with the SCI-ACK-IND(s).

If the SCI-ACK-IND is negative (as illustrated by 260), i.e. there has been collision and the SCI-ACK-IND is for other SCI transmitter(s), the V2X terminal postpones the transmission of the MAC PDU(s) carryingV2X messages on the PSSCH(s) until the next VC-Period to avoid further collision on the data channels, as illustrated in step 261.

Alternatively, if the energy level, measured on the monitored SC-FDMA symbols and PRBs where the SCI-ACK-IND is expected, is below the implementation configurable threshold (as illustrated by 255), the MAC PDU(s) are transmitted on the PSSCH(s) at step 256. The reception of these MAC PDU(s) is not guaranteed because full collision may have occurred at the receiver(s), or the receiver(s) may have departed from the transmission range/region.

Figure 8:
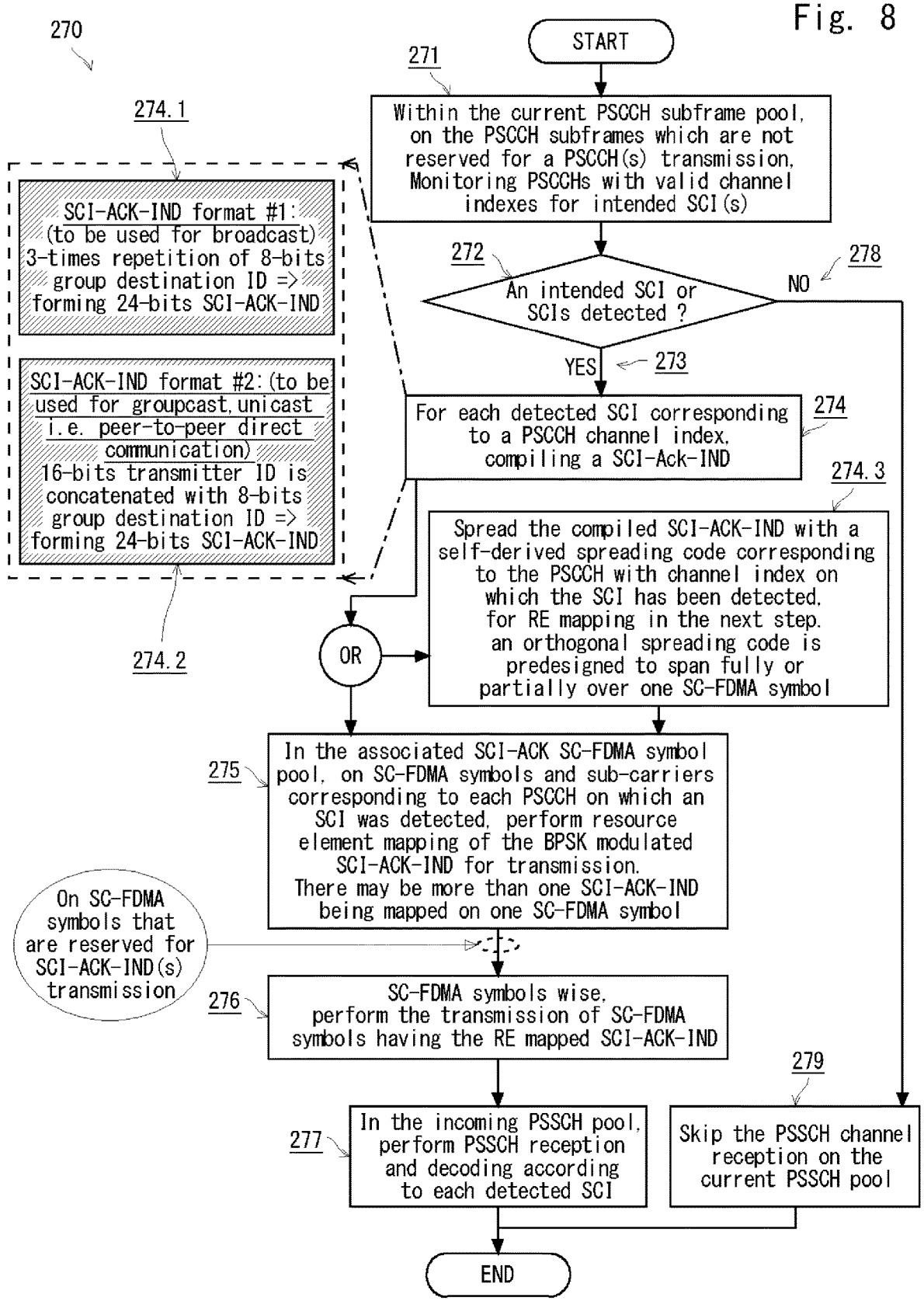
FIG. 8 illustrates a method of collision detection and handling, for use at a V2X data receiver, according to an embodiment of the present invention.

FIG. 8 illustrates a method 270 of collision detection and handling, for use at a V2X data receiver, according to an embodiment of the present invention. The method 270 is similar to the method 250 described above with reference to FIG. 7, but at a V2X data receiver.

At step 271, the V2X terminal monitors PSCCH subframes (with valid PSCCH indexes in the PSCCH subframe pool) which are not reserved for transmission of SCI by the V2X terminal. As the transmission and reception of data is half-duplex, the V2X terminal cannot monitor the PSCCH (s) and transmit data on the PSCCH(s) on the same subframe.

At step 272, it is determined whether an SCI has been detected on the monitored PSCCH subframe pool 210. If an SCI has been detected (as illustrated by 273), a unique SCI-ACK-IND for responding to the SCI transmitters is compiled for each detected SCI, at step 274.

The unique SCI-ACK-IND may comprise an 8-bit group destination ID, which is repetition coded 3 times to form 24-bits to form the SCI-ACK-IND, for use in broadcast communication, as illustrated in 274.1. Alternatively, the unique SCI-ACK-IND may comprise an 8-bit group destination ID and a 16-bit SCI transmitter ID to form a 24-bit SCI-ACK-IND for use in unicast or groupcast communication (274.2).

If code-multiplexing is used, multiple SCI-ACK-IND channels are multiplexed on an SC-FDMA symbol at step 274.3. The compiled 24-bits SCI-ACK-IND is further spreaded using a self-derived orthogonal spreading code for mapping over full or partial designated SC-FDMA symbols. Where an orthogonal spreading code is self-derived according to the control channel with index on which a positive SCI has been detected, the spreaded SCI-ACK-IND channel is further processed at step 275.

At step 275, the SCI-ACK-IND channel is RE mapped. In particular, in the SCI-ACK SC-FDMA symbol pool 220 associated with the PSCCH subframe pool 210, and on SC-FDMA symbols corresponding to PSCCH/PSCCHs on which one or more SCIs have been detected, RE mapping of the DFT-precoded SCI-ACK-IND channel is performed. There may be more than one SCI-ACK-IND channel being mapped onto an SC-FDMA symbol, and there may be more than one SCI ACK-IND.

At step 276, an SC-FDMA signal is generated based upon the SC-FDMA symbols, and the SC-FDMA signal is transmitted, and at step 277, PSSCH reception and decoding is performed according to each detected and acknowledged SCI, in the associated PSSCH pool 230.

Alternatively, if no SCI has been detected at step 272 on the monitored PSCCH subframe pool 210 (as illustrated by 278), the PSSCH reception and decoding is skipped on the PSSCH pool 230, as illustrated by step 279.

By using the VC-Period structure 203, applying the method 250 for detecting and handling collision at a V2X data transmitter, and applying method 270 at a V2X data receiver for assisting collision detection and handling, the collision problems discussed in the background section are not only able to be resolved, but also further prevented as being discussed in the following examples.

In the presence of hidden terminal(s), the collision can be quite severe as previously discussed. By using the VC-Period structure 203, and applying the method 250 and associated method 270, collision on the control channel (i.e. PSCCH) caused by the hidden terminal can be detected and any further (and unnecessary) transmission on the data channel (i.e. PSSCHs) can be avoided to conserve the V2X device's energy as well as to eliminate unnecessary noise/interference.

Figure 9A:
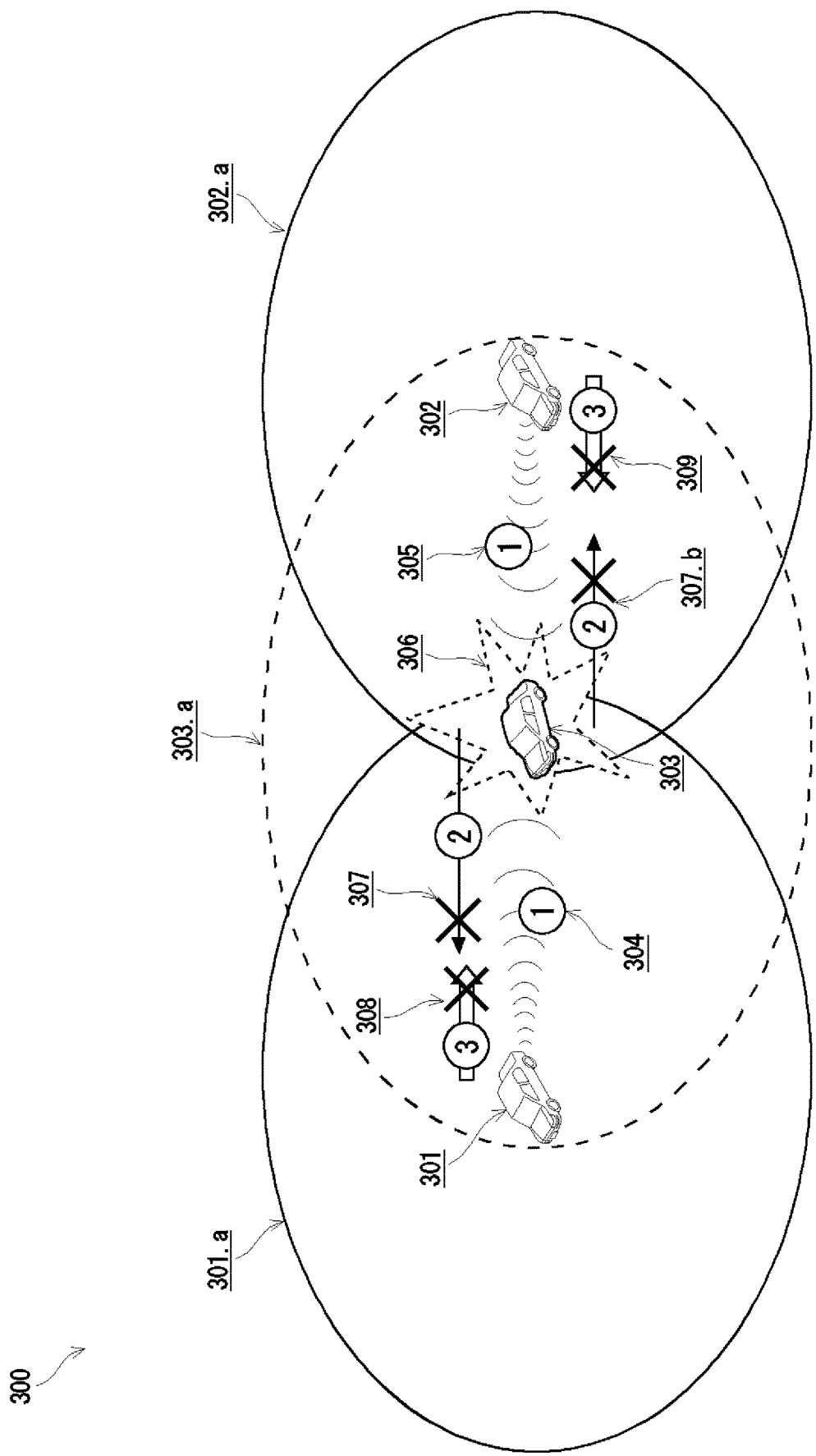
FIG. 9A illustrates a part of an exemplary collision handline scenario, according to an embodiment of the present invention.

FIG. 9A illustrates a part of an exemplarily collision handline scenario 300, according to an embodiment of the present invention. FIG. 9B illustrates the remaining part of the exemplary collision handline scenario, according to an embodiment of the present invention.

A first V2X terminal 301, having transmission range 301.a, and second V2X terminal 302, having transmission range 302.a, are out-of-transmission range with each other and therefore not aware of the presence of one another. On a VC-Period 203, both V2X terminals 301, 302 happen to have data to transmit to a third V2X terminal 303, which in turn has transmission range 303.a, which overlaps with the transmission range 301.a, 302.a of both V2X terminals 301, 303.

In a PSCCH subframe pool 210 within the VC-Period 203, both V2X terminals 301, 302 happen to select the same control channel index for transmitting their SCI (as illustrated by 304 and 305) to the third V2X terminal 303, which results in full collision 306 at the third V2X terminal 303. As a result, the third V2X terminal 303 cannot detect and decode the SCI sent by either of the V2X terminals 301, 302.

After transmitting the SCI 304 and the SCI 305 concurrently in the PSCCH subframe pool 210, both the first and second V2X terminals 301, 302 monitor the associated SCI-ACK SC-FDMA symbol pool 220 for a positive SCI-ACK-IND 307, 307.b. Since full collision has happened on the SCI transmission, the third V2X terminal 303 could not detect any SCI intended for it and therefore it does not respond with any SCI-ACK-IND.

Upon failing to detect a positive SCI-ACK-IND, both the first and second V2X terminals 301, 302 will not transmit their scheduled data on the PSSCHs 308, 309 (which shall appear redundant anyway) in the associated PSSCH pool 230. This conserves their energy and also protects the wireless channel environment from unnecessary noise and interference.

Figure 10:
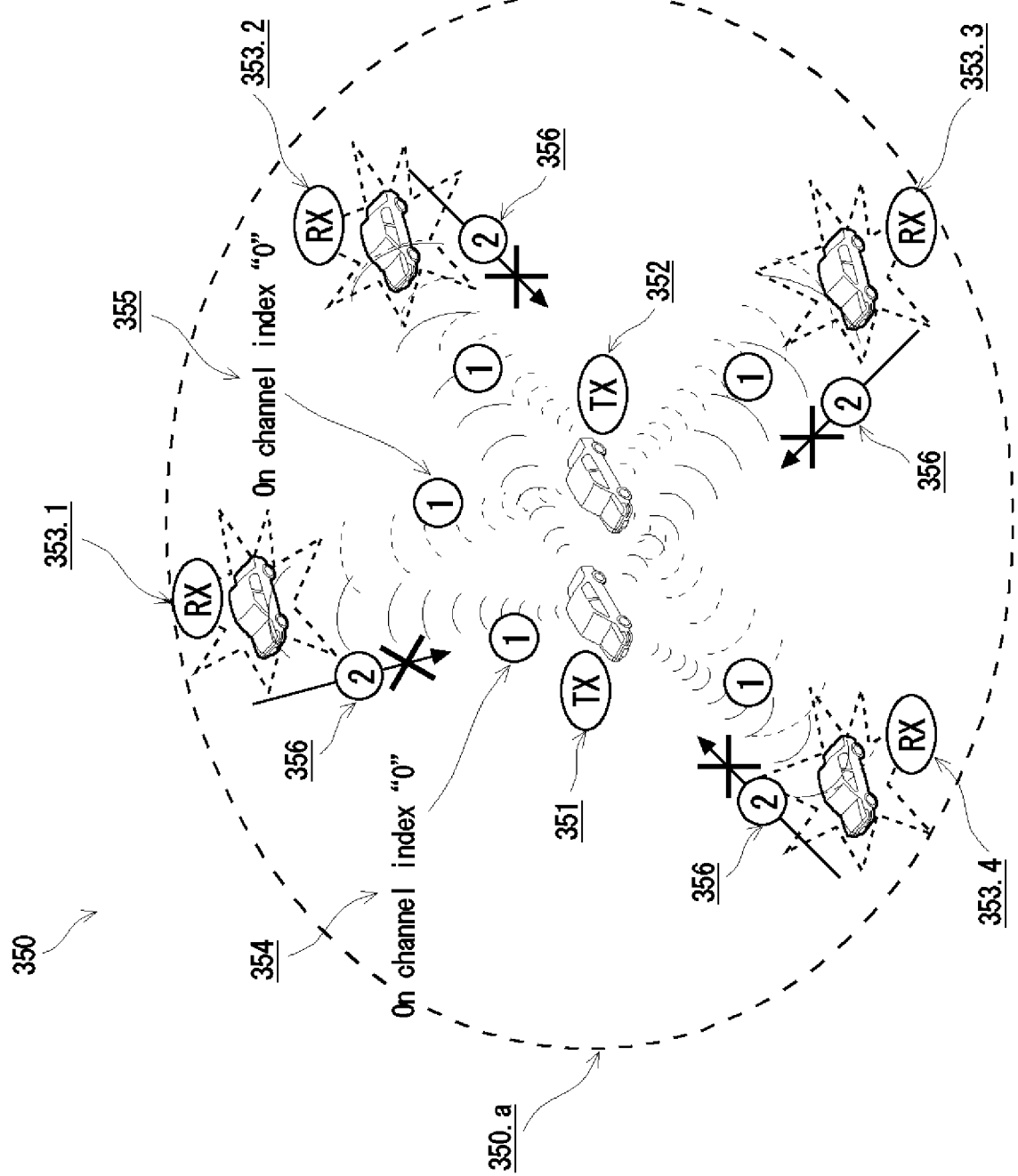
FIG. 10 illustrates a further exemplary collision handline scenario, according to an embodiment of the present invention.

Similarly, the VC-Period structure 203, and methods 250, 270 can be used in detecting and handling collision, in broadcast and/or groupcast communication. FIG. 10 illustrates a further exemplarily collision handline scenario 350, in this context, according to an embodiment of the present invention.

First and second V2X terminals 351, 352 belong to the same group, are within close proximity with each other and have the same transmission range 350.a. As such, the first and second V2X terminals 351, 352 are aware of the presence to each other.

On a VC-Period 203, both the first and second V2X terminals 351, 352 happen to have data to transmit to other surrounding V2X terminals 353.1, 353.2, 353.3, 353.4 in their group. The first and second V2X terminals 351, 352 happen to select the same control channel index (i.e. index "0") for transmitting the SCI 354 and SCI 355 on PSCCHs in the PSCCH subframe pool 210, which results in full collision at the surrounding V2X terminals 353.1, 353.2, 353.3, 353.4. As such, the V2X terminals 353.1, 353.2, 353.3, 353.4 cannot detect and decode the SCI from either of the first and second V2X terminals 351, 352.

After transmitting the SCI 354, 355, both V2X terminals 351, 352 monitor the associated SCI-ACK SC-FDMA symbol pool 220 for a positive SCI-ACK-IND 356. Since full collision has happened on the SCI transmission, none of the V2X terminals 353.1, 353.2, 353.3, 353.4 detected any SCI intended for them and therefore none of them respond with any SCI-ACK-IND.

As both V2X terminals 351, 352 failed to detect a SCI-ACK-IND 356, they will not transmit their scheduled data on the PSSCHs in the associated PSSCH pool 250. As described above, transmission of the data under such circumstances is useless, and as such, the V2X terminals 351, 352 are able to conserve their energy and also to protect the wireless channel environment from unnecessary noise and interference.

Figure 11A:
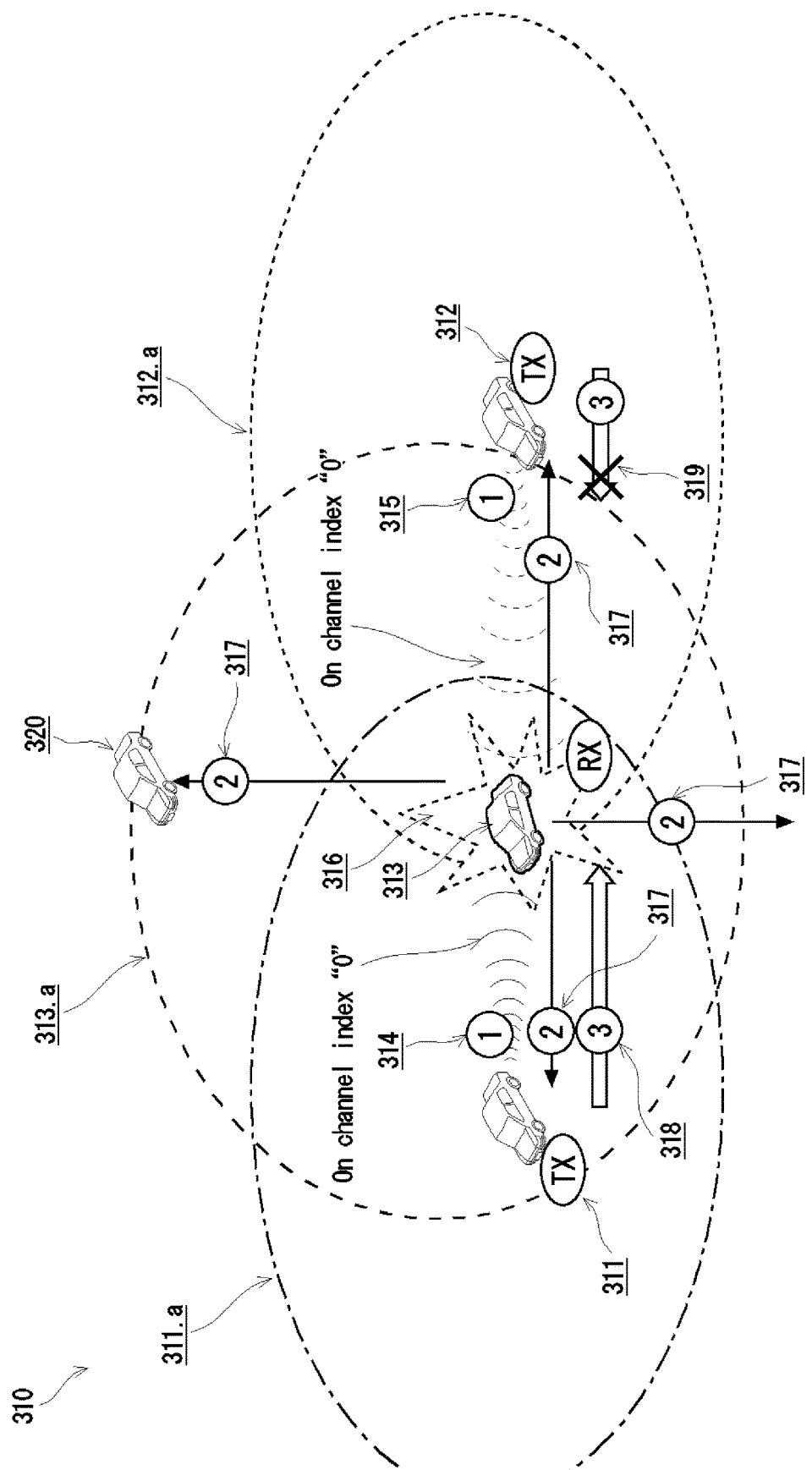
FIG. 11A illustrates a part of a further exemplary collision handline scenario, according to an embodiment of the present invention.
Figure 11B:
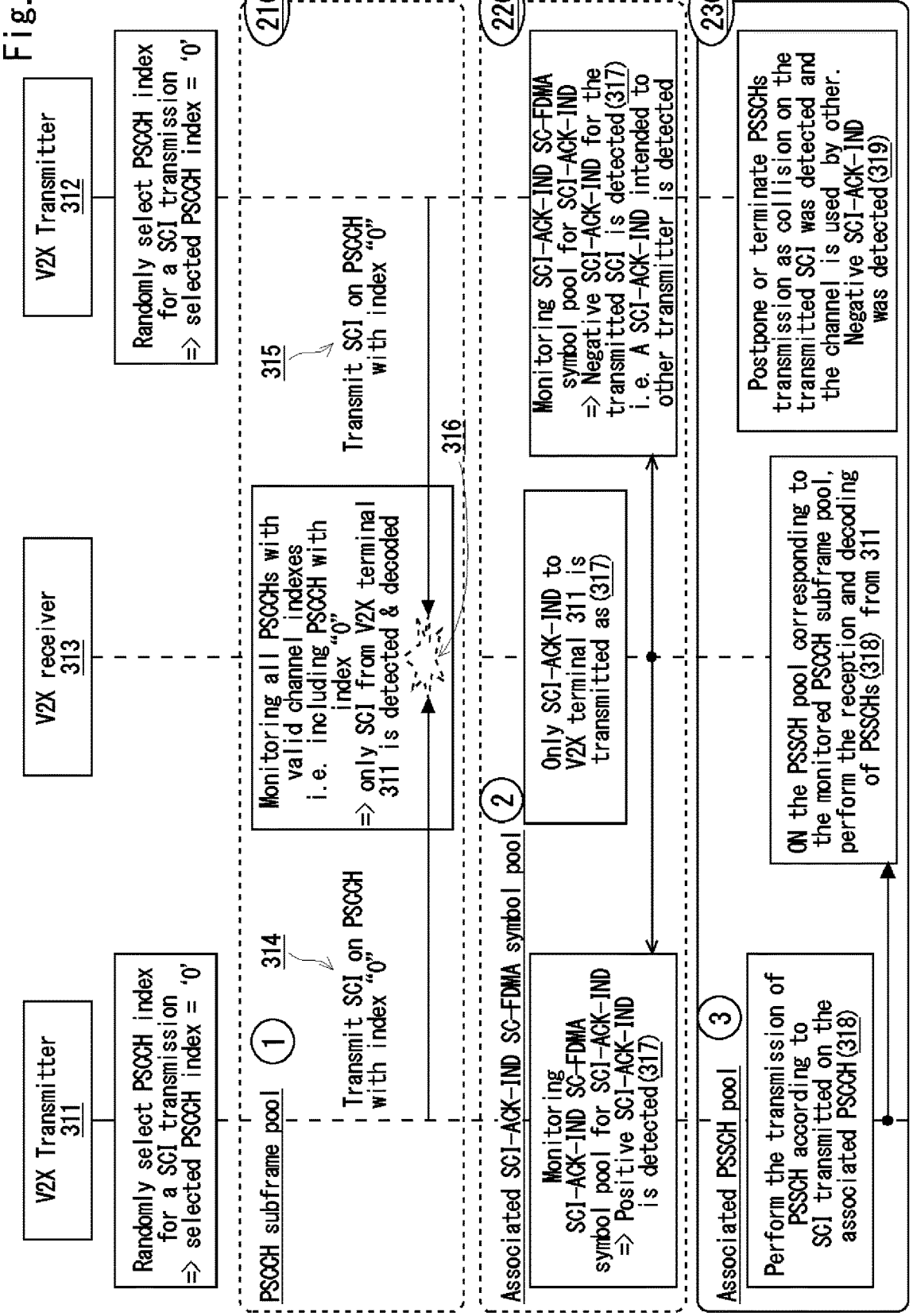
FIG. 11B illustrates the remaining part of the further exemplary collision handline scenario, according to an embodiment of the present invention.

As discussed above, where there exists difference in channel gain between two or more hidden data transmitters and the common data receiver, there may be partial collision on control channels at the common data receiver where only control information sent from the high channel gain V2X terminal is detected and decoded at the data receiver. By using the VC-Period structure 203, and the methods 250, 270, further collision on data channel transmission can be prevented, and as such, unnecessary data retransmission can be avoided. FIG. 11A illustrates a part of a further exemplarily collision handline scenario 310, in this context, according to an embodiment of the present invention. FIG. 11B illustrates the remaining part of the further exemplary collision handline scenario 310, according to an embodiment of the present invention.

A first V2X terminal 311 having transmission range 311.a and a second V2X terminal 312 having transmission range 312.a are out-of-transmission range with each other and are thus not aware of the presence of the other (i.e. are hidden to each other). On a VC-Period 203, both V2X terminals 311, 312 happen to have data to transmit to a third V2X terminal 313, which in turn has transmission range 313.a covering both the first and second V2X terminals 311 and 312.

In a PSCCH subframe pool 210 within the VC-Period 203, both V2X terminals 311, 312 happen to select the same control channel index for transmitting their SCI 314, 315 on PSCCHs to the third V2X terminal 313. That results in partial collision 316 at the third V2X terminal 313, i.e. the third V2X terminal 313 can only detect and decode the SCI from the first V2X terminal 311 and not the second V2X terminal 312.

After transmitting the SCI 314, 315 in the PSCCH subframe pool 210, both the first and second V2X terminals 311, 312 monitor the associated SCI-ACK SC-FDMA symbol pool 220 for a positive SCI-ACK-IND. Since the third V2X terminal 313 has detected only the SCI sent from the first V2X terminal 311 on PSCCH index "0", it therefore responds with the SCI-ACK-IND 317 to the first V2X terminal 311 on an SCI-ACK-IND channel corresponding to PSCCH index "0" on the associated SCI-ACK SC-FDMA symbol pool 220.

The transmitted SCI-ACK-IND 317 is heard by the first and second V2X terminals 311 and 312, as well as other V2X terminal(s) (such as V2X terminal 320) within the transmission range 313.a that monitor the SCI-ACK SC-FDMA symbol pool 220.

Upon detecting the positive SCI-ACK-IND intended for it, the first V2X terminal 311 transmits the scheduled data on PSSCHs 318 in the corresponding PSSCH pool 230. In contrast, the second V2X terminal, which detects the SCI-ACK-IND intended for the first V2X terminal 311 (i.e. a negative SCI-ACK-IND for itself), postpones or terminates the scheduled data transmission on the PSSCH(s) in the corresponding PSSCH pool 230 to prevent further interference to the first V2X terminal 311 or other V2X terminals. Other V2X terminals, such as terminal 320, may use the SCI-ACK-IND intended for the first V2X terminal 311 to prevent future collision on the control channel having the channel index in the SCI-ACK-IND.

Figure 12:
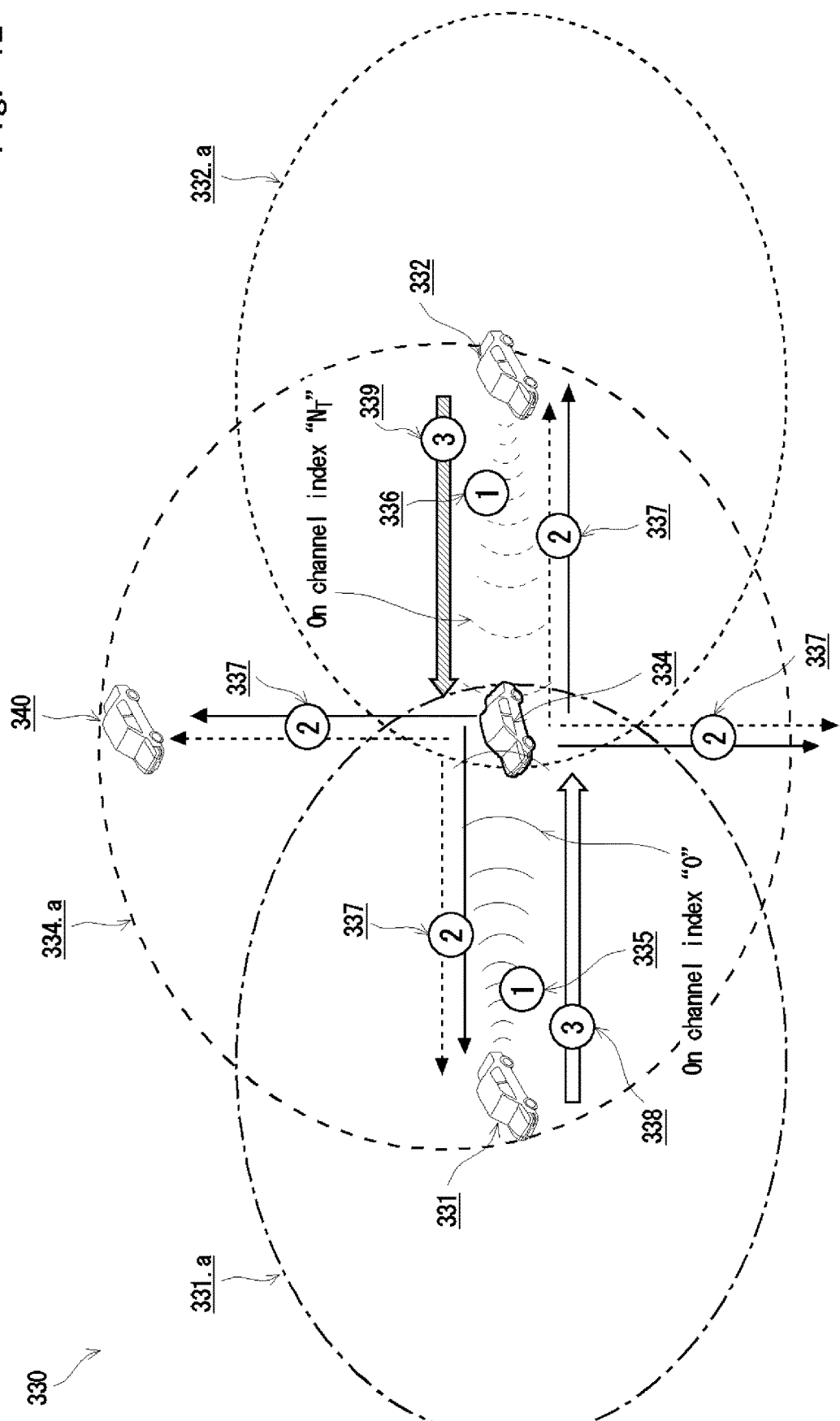
FIG. 12 illustrates a further exemplary collision handline scenario, according to an embodiment of the present invention.

Additionally, the VC-Period structure 203, and methods 250, 270 can be used to make the channel utilisation of a hidden terminal available to V2X terminals beyond its transmission range, and therefore preventing further collision with the hidden terminal. FIG. 12 illustrates a further exemplarily collision handline scenario 330, in this context, according to an embodiment of the present invention.

A first V2X terminal 331 having transmission range 331.a and a second V2X terminal 332 having transmission range 332.a are out of transmission range of each other, and are thus not aware of the presence of each other.

On a VC-Period 203, both the first and second V2X terminals 331, 332 happen to have data to transmit to a third V2X terminal 334, which in turn has transmission range 334.a covering both the first and second V2X terminals 331, 332. In a PSCCH subframe pool 210 within the VC-Period 203, the V2X terminals 331, 332 happen to select two different control channel indexes (such as channel index '0' and '1') for transmitting their SCI on PSCCHs 335, 336 to the third V2X terminal 334. As such, there is no collision at the third V2X terminal 334.

Upon successful detection and decoding of the SCI from both the first and second V2X Terminals 331, 332, the third V2X terminal 334 responds with SCI-ACK-INDs 337 to the first and second V2X terminals 331, 332. The SCI-ACK-INDs 337 are mapped on two separate SCI-ACK-IND channel indexes in an SCI-ACK SC-FDMA symbol pool 220, corresponding to the PSCCH indexes on which the SCI from the first and second V2X Terminals 331, 332 were received.

The transmitted SCI-ACK-INDs 337 are received by the first and second V2X terminals 331, 332, as well as by other V2X terminal(s), such as V2X terminal 340, that monitor the SCI-ACK SC-FDMA symbol pool 220 and are within the transmission range 334.a.

The first and second V2X terminals 331, 332 successfully detect positive SCI-ACK-INDs corresponding to their transmitted SCI, and also detect the SCI-ACK-IND intended to the other V2X terminal (i.e. 332 or 331). Upon detecting SCI-ACK-IND intended for other V2X terminals (i.e. negative SCI-ACK-INDs) on the SCI-ACK-IND channel indexes corresponding to the PSCCH channel indexes that it did not use, a V2X terminal may prevent future collision on the control channel(s) by not using such channel index(es).

Figure 13A:
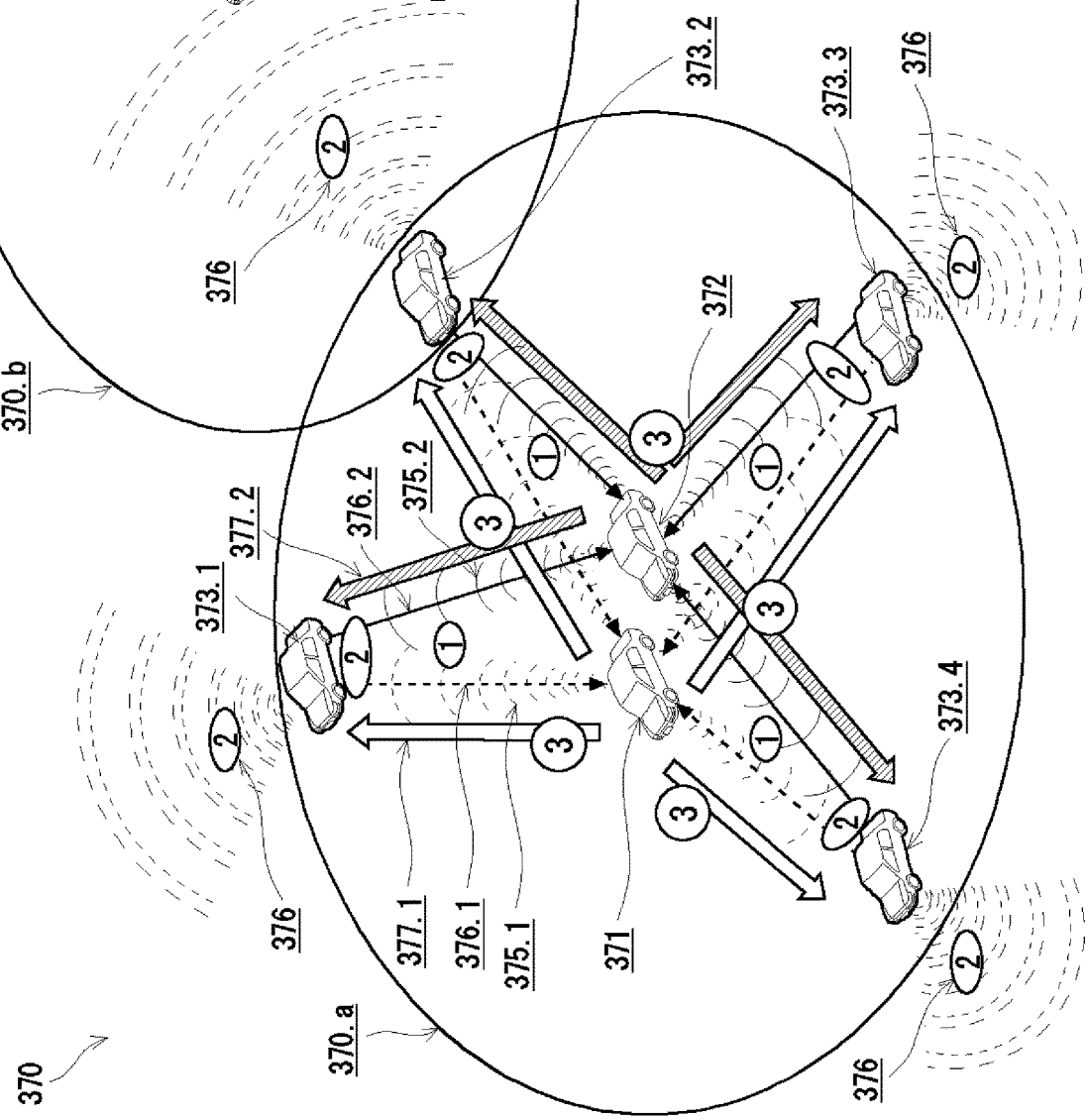
FIG. 13A illustrates a part of a further exemplary collision handline scenario, according to an embodiment of the present invention.
Figure 13B:
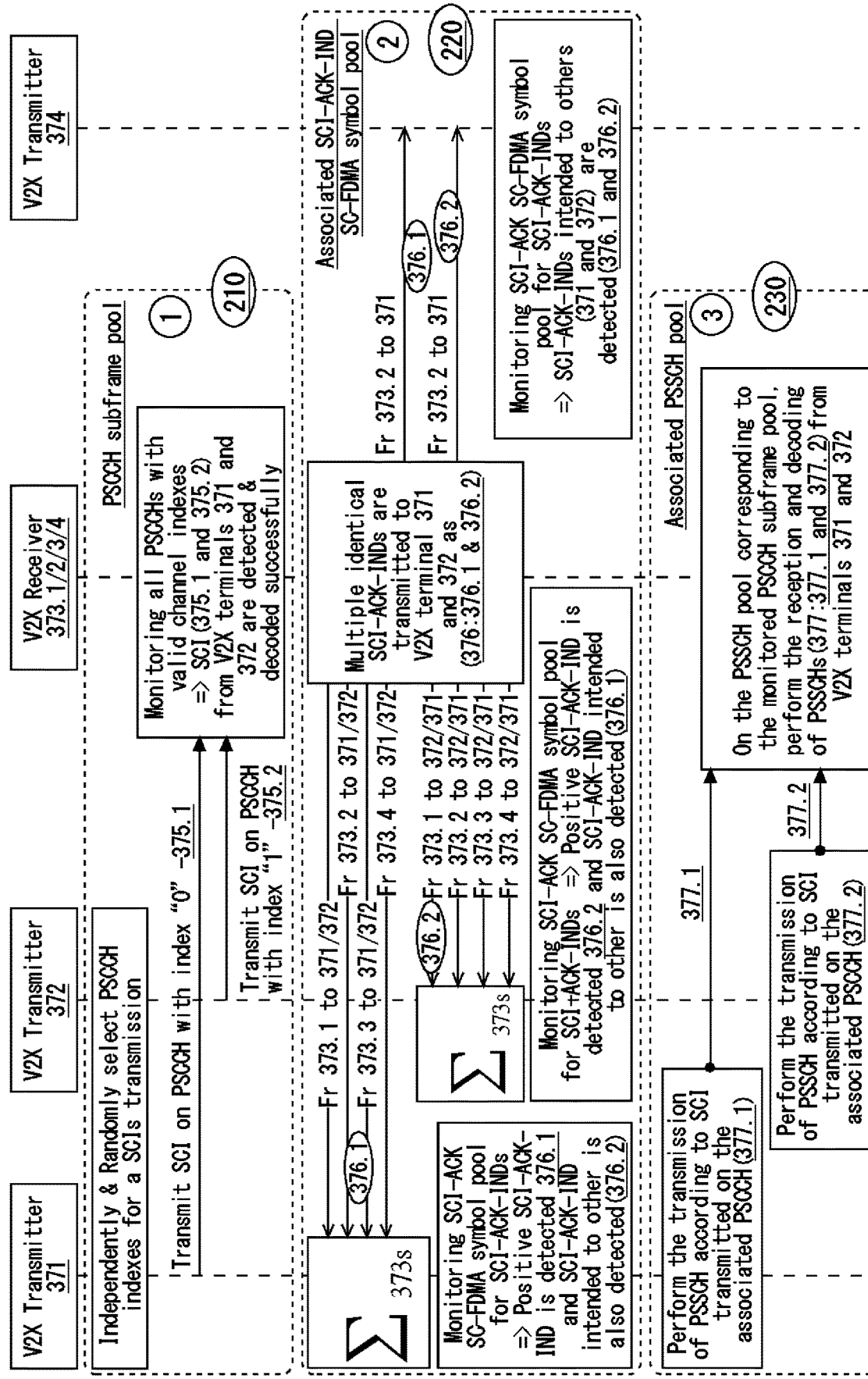
FIG. 13B illustrates the remaining part of the further exemplary collision handline scenario, according to an embodiment of the present invention.

Finally, in group communication, the VC-Period structure 203 and the methods 250, 270 may be used to also prevent collision from other terminals outside the group, that are hidden to one or more V2X terminals in the group. FIG. 13A illustrates a part of a further exemplarily collision handline scenario 370, in this context, according to an embodiment of the present invention. FIG. 13B illustrates the remaining part of the further exemplary collision handline scenario 370, according to an embodiment of the present invention.

First and second V2X terminals 371 and 372 belong to the same group and are within close proximity of each other and have the same transmission range 370.a. As such, the first and second V2X terminals 371, 372 are aware of the presence to each other. On a VC-Period 203, both the first and second V2X terminals 371, 372 happen to have data to transmit to other surrounding V2X terminals 373.1, 373.2, 373.3, 373.4 in the their group, and select the different control channel indexes (i.e. index "0" and index "1") for transmitting their SCI on PSCCHs in the PSCCH subframe pool 210. As such, there is no collision at the surrounding V2X terminals 373.1, 373.2, 373.3, 373.4, and all of the surrounding V2X terminals 373.1, 373.2, 373.3, 373.4 can detect and decode the SCI intended for them.

After transmitting the SCI 375.1, 375.2 to the surrounding V2X terminals 373.1, 373.2, 373.3, 373.4 in the group, both the first and second V2X terminals 371, 372 monitor the associated SCI-ACK SC-FDMA symbol pool 220 for a positive SCI-ACK-IND 376.1, 376.2. Since no collision has happened, all surrounding V2X terminals 373.1, 373.2, 373.3, 373.4 respond with the same unique SCI-ACK-IND signals to the first and second V2X terminals 371, 372. The SCI-ACK-IND signal transmitted at V2X terminals 373.1, 373.2, 373.3, 373.4 are timing-advance adjusted so that they arrive at the V2X terminal (371 or 372) within the CP length, hence appearing as multipath signals for non-coherent detection at the first and second V2X terminals 371, 372.

Upon detecting the positive SCI-ACK-IND 376 in the SCI-ACK SC-FDMA symbol pool 220, both V2X terminals 371, 372 transmit their data on different TRP and/or PRBs in the associated PSSCH pool 230.

For a V2X terminal that is outside the group coverage 370.a, such as V2X terminal 374, while monitoring the SCI-ACK SC-FDMA symbol pool 220, the V2X terminal 374 may detect the SCI-ACK-IND 376 sent to the V2X terminal 371 and/or 372 from a V2X terminal within its range, such as V2X terminal 373.2, and further use that information for collision avoidance when it wants to transmit data to the V2X terminal 373.2 or other V2X terminals within its transmission range 370.b using the same resource configuration as the one used in 370.a group.

Embodiments of the invention assist in collision detection at V2X devices, and in detecting and handling collision caused by other V2X devices or legacy D2D devices who happen to operate on the same communication period. In such case, a V2X device may postpone or terminate its data transmission to avoid further collision on data channels when it is appropriate.

When comparing with other methods to avoid collision, e.g. random back-off, where a device waits a random period of time before transmitting data again, embodiments of the present invention do not introduce additional latency. In particular, in embodiments of the present invention, a V2X device can contend for a channel as soon as it has data to send. In case a collision is detected, it may choose another channel in the next transmission, and resort to random back-off only after multiple failed transmission attempts.

Embodiments of the present invention also enable receivers to act as range extension (or second hop signals), extending the range in which the resource utilisation of a transmitter is known.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

INDUSTRIAL APPLICABILITY

The present invention relates to data communication. In particular, the present invention relates to Vehicle to Everything (V2X) communication.

The invention claimed is:

1. A data communication method for use in a vehicle-to-everything (V2X) communication system, the method comprising:
   selecting, at a first V2X device, a control channel of a control channel resource pool;
   transmitting, on the selected control channel, sidelink control information (SCI) to a second V2X device;
   monitoring, at the first V2X device, an SCI acknowledgement (SCI-ACK) resource pool for an SCI-ACK indicator (SCI-ACK-IND) corresponding to the transmitted SCI; and
   in response to receiving a positive SCI-ACK-IND corresponding to the transmitted SCI, transmitting data to the second V2X device in a data resource pool according to the SCI, wherein
   the SCI-ACK resource pool comprises one or more SC-FDMA symbols from one or more V2X subframes, and
   a number of SC-FDMA symbols collectively forming the SCI-ACK resource pool is equal to a number of subframes that form the control channel resource pool.

2. The method as claimed in claim 1, further including:
   determining that a positive SCI-ACK-IND corresponding to further SCI has not been received; and
   in response there, postponing transmission of the data relating to the further SCI until at least a subsequent V2X communication period (VC-Period).

3. The method as claimed in claim 1, wherein the control channel is randomly or pseudo-randomly selected from the control channel resource pool.

4. The method as claimed in claim 1, wherein the first V2X device monitors the control channel resource pool in a V2X communication period (VC-Period) for other V2X terminal usage prior to transmission of data on a subsequent VC-Period.

5. The method as claimed in claim 1, wherein the control channel resource pool, the SCI-ACK resource pool and the data resource pool may form a communication period.

6. The method as claimed in claim 5, where the communication period comprises a legacy sidelink communication period (SC-Period) including the SCI-ACK resource pool.

7. The method as claimed in claim 1, further including a one-to-one mapping between control channel indexes in the control channel resource pool, and SCI-ACK-IND channel indexes in the SCI-ACK resource pool.

8. The method as claimed in claim 1, wherein multiple SCI-ACK-IND channels are frequency-multiplexed on a physical resource block for transmission on the same SC-FDMA symbol or symbols.

9. The method as claimed in claim 1, wherein multiple SCI-ACK-IND channels are code-multiplexed using control channel indexes for self-deriving orthogonal spreading codes, for transmission on the same SC-FDMA symbol.

10. The method as claimed in claim 1, where the SCI-ACK-IND comprises an SCI transmitter identifier and a destination identifier.

11. The method as claimed in claim 10, wherein the destination identifier comprise a group destination identifier.

12. The method as claimed in claim 1, wherein the SU-ACK-IND is channel-encoded and modulated to form a sequence of symbols, and wherein the sequence is discrete Fourier transform-precoded (DFT-precoded) and RE-mapped on subcarriers of a SCI-ACK-IND channel of the SCI-ACK resource pool.

13. The method as claimed in claim 12, where the sequence of symbols is spreaded using an orthogonal spreading code is derived from an associated control channel index.

14. The method as claimed in claim 13, where the spreaded sequence of symbols is resource-element-mapped at least partially over an SC-FDMA symbol.

15. The method as claimed in claim 1, wherein the SCI-ACK-IND being transmitted at plurality of second V2X devices, is timing advance adjusted to reach the first V2X device within a cyclic prefix (CP) length.

16. The method as claimed in claim 1, further comprising
monitoring, at a third V2X device, the SCI-ACK resource pool for SCI-ACK-INDs corresponding to SCI of other V2X devices;
wherein a control channel of the control channel resource pool is selected at the third V2X device at least in part according to a received SCI-ACK-IND of another V2X device.

17. A vehicle-to-everything (V2X) communication system including a first V2X device and a second V2X device, wherein the first V2X device is configured to:

select a control channel of a control channel resource pool;

transmit, on the selected control channel, sidelink control information (SCI) to the second V2X device;

monitor, at the first V2X device, an SCI acknowledgement (SCI-ACK) resource pool for an SCI-ACK indicator (SCI-ACK-IND) corresponding to the transmitted SCI; and in response to receiving a positive SCI-ACK-IND corresponding to the transmitted SCI, transmit data to the second V2X device in a data resource pool according to the SCI, wherein the SCI-ACK resource pool comprises one or more SC-FDMA; symbols from one or more V2X subframes, and a number of SC-FDMA symbols collectively forming the SCI-ACK resource pool is equal to a number of subframes that form the control channel resource pool.

* * * * *

UNITED STATES PATENT AND TRADEMARK OFFICE
CERTIFICATE OF CORRECTION

PATENT NO. : 10,674,334 B2
APPLICATION NO. : 16/067153
DATED : June 2, 2020
INVENTOR(S) : Phong Nguyen Page 1 of 1

It is certified that error appears in the above-identified patent and that said Letters Patent is hereby corrected as shown below:

In the Claims

Column 16, Lines 18-19; In Claim 1, delete "SC-FDMA" and insert --single carrier – frequency division multiple access (SC-FDMA)-- therefor Column 16, Line 63; In Claim 12, delete "SU-ACK-IND" and insert --SCI-ACK-IND-- therefor Column 17, Line 12; In Claim 16, after "comprising", insert --:--

Column 16, Lines 18-19; In Claim 17, delete "SC-FDMA;" and insert --single carrier – frequency division multiple access (SC-FDMA)-- therefor Signed and Sealed this
Twenty-fourth Day of November, 2020

Andrei Iancu
*Director of the United States Patent and Trademark Office*